United States Patent
Kalis et al.

(10) Patent No.: US 10,270,868 B2
(45) Date of Patent: Apr. 23, 2019

(54) RANKING OF PLACE-ENTITIES ON ONLINE SOCIAL NETWORKS

(71) Applicant: Facebook, Inc., Menlo Park, CA (US)

(72) Inventors: Jan Kalis, New York, NY (US); Justin Moore, Brooklyn, NY (US); Robert James Sicurelli, III, Manhattan, NY (US)

(73) Assignee: Facebook, Inc., Menlo Park, CA (US)

( * ) Notice: Subject to any disclaimer, the term of this patent is extended or adjusted under 35 U.S.C. 154(b) by 388 days.

(21) Appl. No.: 14/935,289

(22) Filed: Nov. 6, 2015

(65) Prior Publication Data

US 2017/0134508 A1    May 11, 2017

(51) Int. Cl.
*H04L 29/06* (2006.01)
*H04L 29/08* (2006.01)
*H04L 12/58* (2006.01)

(52) U.S. Cl.
CPC .............. *H04L 67/18* (2013.01); *H04L 51/32* (2013.01); *H04L 67/22* (2013.01)

(58) Field of Classification Search
CPC ................................ H04L 67/18; H04L 51/32
USPC ........................................................ 709/204
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,565,157 B1 | 6/2009 | Ortega | |
| 7,714,778 B2 | 5/2010 | Dupray | |
| 7,752,326 B2 | 7/2010 | Smit | |
| 7,783,630 B1 | 8/2010 | Chevalier | |
| 7,836,044 B2 | 11/2010 | Kamvar | |
| 7,903,029 B2 | 3/2011 | Dupray | |
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |

(Continued)

OTHER PUBLICATIONS

U.S. Appl. No. 14/935,263, filed Nov. 6, 2015, Kalis.

(Continued)

*Primary Examiner* — Adnan M Mirza
(74) *Attorney, Agent, or Firm* — Baker Botts L.L.P.

(57) ABSTRACT

In one embodiment, a method includes, by one or more computing devices of an online social network, sending, to a client system of a first user of the online social network, a first request to compare two or more place-entities associated with the online social network, where the first user is connected to each place-entity within a social graph of the online social network, each place-entity being associated with a particular score on a first scoring scale and a first feature. The method further includes receiving, from the client system, comparison information responsive to the first request, the comparison information indicating an ordered ranking of the two or more place-entities. The method also includes accessing a scored list of place-entities associated with the online social network, where the scored list is based on scores on the first scoring scale for the place-entities.

37 Claims, 7 Drawing Sheets

(56) References Cited

U.S. PATENT DOCUMENTS

| | | |
|---|---|---|
| 8,112,529 B2 | 2/2012 | Van Den Oord |
| 8,135,413 B2 | 3/2012 | Dupray |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,183,504 B2 | 11/2015 | Moore |
| 9,602,965 B1 | 3/2017 | Kalis |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0161215 A1 | 6/2010 | Karani |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0279708 A1 | 11/2010 | Lidsrom |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184945 A1 | 7/2011 | Das |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0047147 A1 | 2/2012 | Redstone |
| 2012/0058775 A1 | 3/2012 | Dupray |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0103697 A1 | 4/2013 | Hill |
| 2013/0124538 A1 | 5/2013 | Lee |
| 2013/0124542 A1 | 5/2013 | Lee |
| 2013/0144899 A1 | 6/2013 | Lee |
| 2013/0166526 A1 | 6/2013 | Moxley |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |

(56) References Cited

U.S. PATENT DOCUMENTS

| | | |
|---|---|---|
| 2013/0246404 A1 | 9/2013 | Annau |
| 2013/0254305 A1 | 9/2013 | Cheng |
| 2013/0285855 A1 | 10/2013 | Dupray |
| 2014/0006416 A1 | 1/2014 | Leslie |
| 2014/0067535 A1 | 3/2014 | Rezaei |
| 2014/0122465 A1 | 5/2014 | Bilinski |
| 2014/0317736 A1* | 10/2014 | Cao .................. H04L 67/22 726/23 |
| 2015/0188941 A1* | 7/2015 | Boshmaf ............ H04L 63/1441 726/22 |
| 2017/0132226 A1 | 5/2017 | Kalis |

OTHER PUBLICATIONS

U.S. Appl. No. 14/935,324, filed Nov. 6, 2015, Kalis.
Maja Kabiljo; "Recommending items to more than a billion people," https://code.facebook.com/posts/861999383875667/recommending-items-to-more-than-a-billion-people/, Jun. 2, 2015.
U.S. Appl. No. 15/432,457, filed Feb. 14, 2017, Kalis.

* cited by examiner

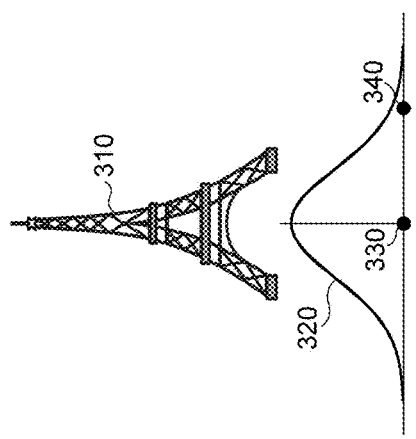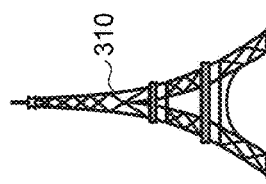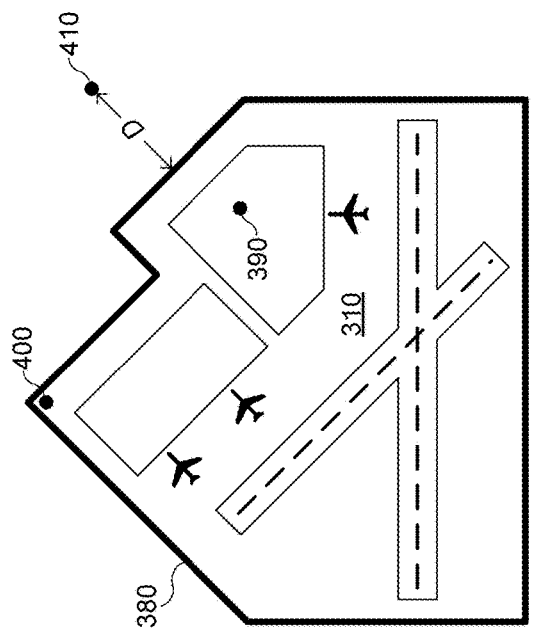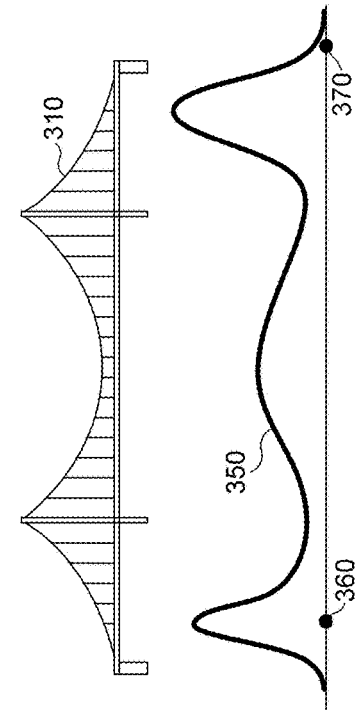
FIG. 3
FIG. 4
FIG. 5
FIG. 6

RANKING OF PLACE-ENTITIES ON ONLINE SOCIAL NETWORKS

TECHNICAL FIELD

This disclosure generally relates to online social networks, and in particular to identifying, determining, ranking, or suppressing entities associated with an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, an online social network may determine one or more places where a user is most likely located based on geographic-location information received from the user's mobile-client system (e.g., a smartphone) or based on social-networking information associated with the user. In particular embodiments, the online social network may identify multiple candidate place-entities based on a user's location. As an example and not by way of limitation, a user's mobile-client system may send a pair of latitude-longitude coordinates to the online social network, and the online social network may identify candidate place-entities that correspond to the latitude-longitude coordinates. Candidate place-entities may be located within a threshold distance of the mobile-client system's location. In particular embodiments, for each candidate place-entity, the online social network may determine a confidence score that represents a probability that the user is located at the candidate place-entity. The confidence score may be based on the user's location and a location-probability distribution associated with the candidate place-entity. The location-probability distribution may represent a model of the spatial-distribution of check-ins associated with the candidate place-entity. As examples and not by way of limitation, a place-entity may be modeled as a point (e.g., a discrete latitude-longitude pair), a power-law distribution, a kernel density estimate, or a polygon. In particular embodiments, the confidence score may also be based on social-graph information associated with the user (e.g., whether the user has previously checked-in to the candidate place-entity via the online social network, or whether one of the user's friends has interacted with the candidate place-entity via the online social network). In particular embodiments, the online social network may send to the user information associated with one or more candidate place-entities having confidence scores above a threshold confidence score. As an example and not by way of limitation, after identifying candidate place-entities and determining confidence scores for the candidate place-entities, the online social network may send to the user a place tip, an advertisement, or a suggestion to perform an action associated with one or more place-entities having confidence scores above 95%.

In particular embodiments, an online social network may rank place-entities based at least in part on comparison information provided by users. As an example and not by way of limitation, an online social network may send to a user a request to compare two restaurants the user has previously visited or interacted with via the online social network. The request may be a pairwise comparison asking the user to select which place-entity they prefer out of two place-entities. In particular embodiments, the online social network may determine a ranked list of place-entities (e.g., top restaurants in Boston) based at least in part on comparison information received from users (e.g., 80% of users indicated they preferred place-entity A over place-entity B). Additionally, the online social network may also use place-entity scores (e.g., scores based on user reviews of place-entities) to generate a ranked list of place-entities. In particular embodiments, the online social network may filter a ranked list to determine various lists of top-ranked place-entities (e.g., in response to user search queries). As an example and not by way of limitation, in response to a request for top-ranked Italian restaurants in the Park Slope neighborhood of Brooklyn, the online social network may filter a ranked list of restaurants in Brooklyn based on location (e.g., Park Slope) and restaurant cuisine (e.g., Italian). In particular embodiments, the online social network may determine a place-classifier algorithm based on a ranked list of place-entities. As an example and not by way of limitation, a ranked list of restaurant place-entities along with features of the place-entities may be used to train a restaurant classifier. A classifier algorithm may be used to predict a ranking of a new place-entity or a result of a pairwise comparison of two place-entities (e.g., predict that there is an 80% probability that a user will select place-entity P over place-entity Q). In particular embodiments, a place-classifier algorithm may be a global classifier that provides various "top X in Y" lists (e.g., top parks in Seattle) to a group of users. In particular embodiments, a place-classifier algorithm may be a personalized classifier that determines a customized list of place-entities tailored to a particular user based at least in part on user-specific features (e.g., the user's age, gender, location, or preferences, or social-networking information associated with the user).

In particular embodiments, an online social network may suppress one or more entities (such as place-entities) from being displayed in search results based on duplication-values or social-graph information. As an example and not by way of limitation, after identifying multiple entities in response to receiving a query from a user, the online social network may suppress an identified entity based at least in part on a duplication-value of the entity with respect to a canonical-entity or social-graph information associated with the entity. A canonical-entity may represent an optimal, preferred, or exemplary entity, and each identified entity may have a duplication-value with respect to the canonical-entity, where the duplication value may indicate a likelihood that two entities are duplicates. A duplication-value may be based at least in part on name similarity, location or distance between entities, social-network interactions, crowdsourcing votes, or redirects. An entity may be suppressed based on a duplication-value (e.g., the online social network may suppress an entity having a duplication-value with respect to a canonical-entity above a threshold duplication-value) or based on social-graph information associated with the entity (e.g., based on a number of check-ins, likes, or reviews associated with the entity). In particular embodiments, suppression of entities based on duplication-values or social-graph information may remove entities which may be inferior, less relevant, or of less interest to users. In particular embodiments, the online social network may send to a client system of a user a search-results page that includes references to one or more non-suppressed entities, and based on how the user interacts with the search-results page, the online social network may adjust (e.g., increase or decrease) a duplication-value of one or more entities.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3-6 each illustrate an example location-probability distribution associated with a place-entity.

DESCRIPTION OF EXAMPLE EMBODIMENTS

System Overview

Figure 1:
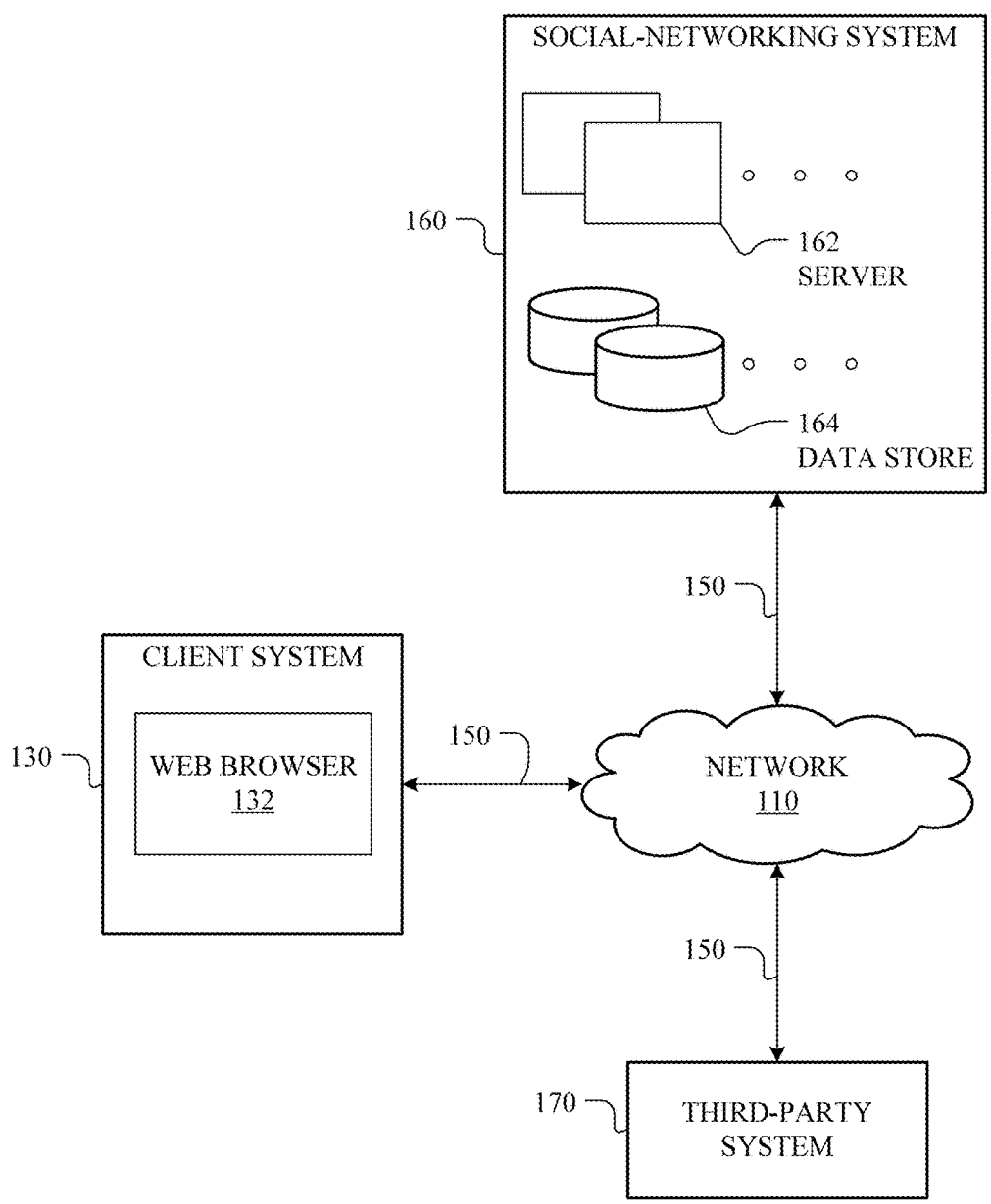
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110.

As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
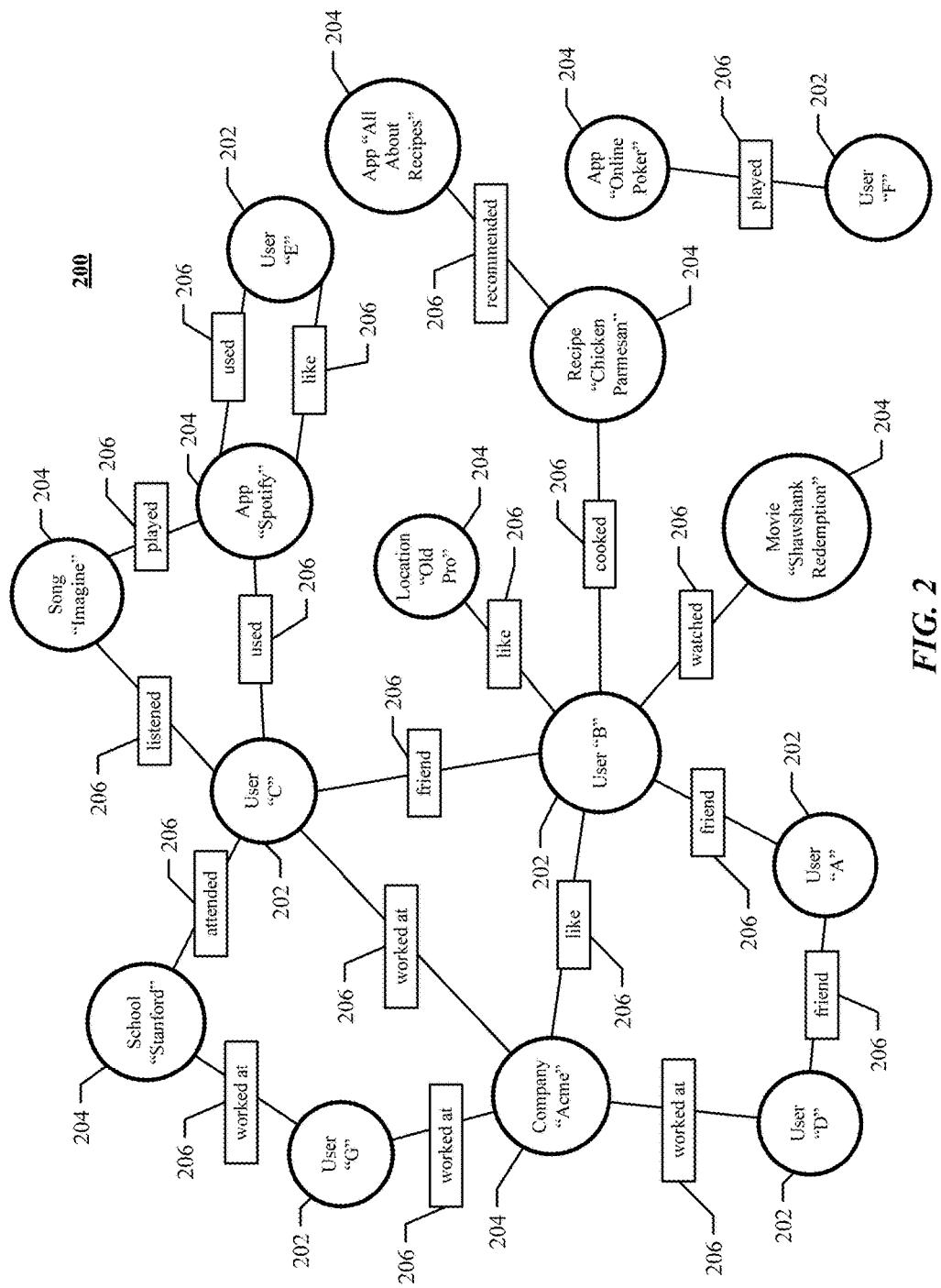
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204.

In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Location Information

In particular embodiments, the social-networking system 160 may determine a geographic location (hereinafter also "location") of an object (e.g., a user, a concept, or a mobile-client system 130 associated with a user or concept). The location of an object may be identified and stored as a street address (e.g., "1601 Willow Road, Menlo Park, Calif."), a set of geographic coordinates (e.g., latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept.

In particular embodiment, the location of a mobile-client system 130 equipped with cellular, Wi-Fi, Global Positioning System (GPS), or other suitable capabilities may be identified with geographic-positioning signals. As an example and not by way of limitation, a mobile-client system 130 may include one or more sensors that may facilitate geo-location functionalities of the system. Processing of sensor inputs by the mobile-client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A mobile-client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile-client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location.

Although this disclosure describes determining the location of an object in a particular manner, this disclosure contemplates determining the location of an object in any suitable manner.

In particular embodiments, the social-networking system 160 may maintain a database of information relating to locations or places. The social-networking system 160 may also maintain meta information about particular locations or places, such as, for example, photos of a location or place, advertisements, user reviews, comments, "check-in" activity data, "like" activity data, hours of operation, or other suitable information related to the location or place. In particular embodiments, a location or place may correspond to a concept node 204 in a social graph 200. The social-networking system 160 may allow users to access information regarding a location or place using a client application (e.g., a web browser or other suitable application) hosted by a mobile-client system 130. As an example and not by way of limitation, social-networking system 160 may serve webpages (or other structured documents) to users that request information about a location or place. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a mobile-client system 130 of the user (or a web- or network-based application using a browser client). The client application may automatically access GPS or other geo-location functions supported by the mobile-client system 130 and report the user's current location to the geo-social-networking system. In addition, the client application may support geo-social networking functionality that allows users to "check-in" at various locations or places and communicate this location or place to other users. A check-in to a given location or place may occur when a user is physically located at a location or place and, using a mobile-client system 130, access the geo-social-networking system to register the user's presence at the location or place. The social-networking system 160 may automatically check-in a user to a location or place based on the user's current location and past location data. In particular embodiments, the social-networking system 160 may allow users to indicate other types of relationships with respect to particular locations or places, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location or place.

Location-Based Place Determination

In particular embodiments, social-networking system 160 may determine one or more places where a user is most likely located based on geographic-location information received from the user's mobile-client system 130 (e.g., a smartphone) or based on social-networking information associated with the user or the user's location. As an example and not by way of limitation, given a set of location coordinates (e.g., a latitude-longitude pair) which represent a user's geographic location, social-networking system 160 may predict the most likely place where the user is located along with a confidence score associated with the prediction. If a user is located in front of Big Apple Cleaners, then, based on the user's location information, social-networking system 160 may determine, with a 95% confidence score, that the user is located at Big Apple Cleaners. If a user is located 20 feet from Big Apple Cleaners and 20 feet from Sancho's Taqueria, then, based on the user's location information as well as social-networking information, social-networking system 160 may determine that the user is located at or is headed to Sancho's Taqueria. For example, the user may have previously visited or checked-in to Sancho's Taqueria and may not have performed any social-networking activities associated with Big Apple Cleaners. As another example, the user may not have performed any social-networking activities associated with either place, but one of the user's friends may have "liked" or recommended Sancho's Taqueria to the user. In particular embodiments, determining one or more places where a user is most likely located may help to disambiguate the place where the user is located when the user is in a geographic area with a high density of places (e.g., malls, multi-story buildings, or dense urban areas). This may be useful when the user is querying for places or wants to perform particular social-networking activities with respect to a particular place-entity (such as check-in at the place).

As used herein, a "place" may refer to a distinct, identifiable, or defined physical area, space, or location, such as for example, an airport, park, shopping mall, train station, bus stop, business, corporate campus, college campus, stadium, amusement park, museum, house, building, neighborhood, city, store, movie theater, restaurant, or landmark. Examples of places include Sancho's Taqueria, Big Apple Cleaners, Columbus Circle, Central Park, Times Square, the Golden Gate Bridge, LaGuardia airport, Disneyland, the Louvre, and the Eiffel Tower. In particular embodiments, a place may be referred to as a physical place or a geographic place. In particular embodiments, a place may correspond to a particular place-entity represented by a particular node in social graph 200 (e.g., a concept node 204 associated with a particular geographic location). For example, the physical place LaGuardia airport may correspond to a place-entity "LaGuardia airport," which is represented by a concept node 204 in social graph 200. Although this disclosure describes and illustrates particular places which correspond to particular place-entities, this disclosure contemplates any suitable places which correspond to any suitable place-entities. In particular embodiments, a place may have any suitable size or dimension (e.g., a length or width of 1 meter, 10 meters, 100 meters, 1 kilometer, 10 kilometers, or any other suitable distance). As an example and not by way of limitation, a place may correspond to a coffee shop with dimensions of approximately 5 meters by 10 meters. In particular embodiments, one or more places may be located nearby or contained within one or more other places. As an example and not by limitation, an airport is a place that may contain multiple other places, such as for example stores or restaurants. Additionally, an airport may have multiple other places located nearby, such as for example, bus stops, hotels, or parking lots. As another example and not by way of limitation, a multi-story building may be considered a place, and the building may also include one or more other places, such as for example, stores or businesses located within the building. Although this disclosure describes and illustrates particular places having particular sizes and containing or being located nearby particular other places, this disclosure contemplates any suitable places having any suitable sizes and containing or being located nearby any suitable other places.

In particular embodiments, one or more computing devices of social-networking system 160 may receive, from a mobile-client system 130 of a user of the social-networking system 160, geographic-location information associated with the mobile-client system 130. In particular embodiments, geographic-location information may refer to information that indicates or corresponds to a particular, unique, or distinct location on earth. As an example and not by way of limitation, geographic-location information may include a pair of latitude-longitude coordinates (e.g., 37.485° latitude, −122.148° longitude). In particular embodiments, geographic-location information may be referred to as location information or location coordinates. Although this disclosure describes particular geographic-location information, this disclosure contemplates any suitable geographic-location information.

In particular embodiments, geographic-location information may include signal-information associated with one or more signals received by a mobile-client system 130. As examples and not by way of limitation, received signals may include GPS signals, Wi-Fi signals, BLUETOOTH signals, cellular signals, near field communication (NFC) signals, or any other suitable signal from an ambient broadcasting device that may be picked up by a mobile-client system 130. In particular embodiments, signal-information may be analyzed by a location-services manager of mobile-client system 130 to determine a latitude-longitude pair corresponding to a location of mobile-client system 130. In other particular embodiments, signal-information may be sent to social-networking system 160, and social-networking system 160 may determine a corresponding location based on the signal-information. In particular embodiments, signal-information may include a signal strength of a received signal or an identifier of a device that sent a signal. As an example and not by way of limitation, mobile-client system 130 may receive a Wi-Fi signal from an Internet-connected computer, and mobile-client system 130 may send to social-networking system 160 an indicator of the signal strength of the Wi-Fi signal along with the computer's IP address. As another example and not by way of limitation, mobile-client system 130 may receive a cellular signal from a cell site, and mobile-client system 130 may send to social-networking system 160 an indicator of the signal strength of the cellular signal and an identifier of the cell site. In particular embodiments, signal strength may indicate approximately how far mobile-client system 130 is located from a device sending a signal. As an example and not by way of limitation, signal strength may vary inversely with distance so that a high signal strength indicates that mobile-client system 130 is located relatively close to a particular transmitting device (e.g., a Wi-Fi device or a cellular site). Although this disclosure describes particular geographic-location information associated with particular signals, this disclosure contemplates any suitable geographic-location information associated with any suitable signals.

In particular embodiments, geographic-location information may include a check-in, via an online social network, by a user. As an example and not by way of limitation, a user may send a check-in via their mobile-client system 130 to social-networking system 160 indicating that they are eating a burrito at Sancho's Taqueria. In particular embodiments, a check-in may include an identifier of a place-entity, location coordinates (e.g., a latitude-longitude pair) of the check-in, a location accuracy (e.g., an indication of the accuracy of the location coordinates), or a time of the check-in. Based on the check-in information, social-networking system 160 may determine the user's geographic-location. Although this disclosure describes particular check-ins that include particular information, this disclosure contemplates any suitable check-ins that include any suitable information.

In particular embodiments, geographic-location information may include a latitude-longitude pair determined based on one or more signals received by mobile-client system 130. As an example and not by way of limitation, a smartphone may include a GPS receiver, and based on GPS signals received by the GPS receiver, the smartphone may determine a latitude-longitude pair (e.g., 37.63°, −116.85°) corresponding to its geographic location. In particular embodiments, geographic-location information may include an accuracy value associated with a latitude-longitude pair. As an example and not by way of limitation, a user walking across the Golden Gate Bridge may send (via their smartphone) to social-networking system 160 the latitude-longitude coordinates 37.8105°, −122.4771° as well as an accuracy value of 5 meters. In particular embodiments, an accuracy value may include any suitable distance (e.g., 1 m, 5 m, or 10 m) and may indicate an accuracy of associated geographic-location information. As an example and not by way of limitation, an accuracy value of 5 meters may indicate that the user's location information is accurate to within 5 meters of the associated geographic-location information. In particular embodiments, an accuracy value may depend at least in part on the signal strength of a received GPS signal or on the number of satellites from which GPS signals are received. As an example and not by way of limitation, a location determined based on signals from eight GPS satellites may have an accuracy value of 2 meters, while a location based on signals from four GPS satellites may have an accuracy value of 10 meters.

In particular embodiments, social-networking system 160 may identify multiple candidate place-entities associated with the social-networking system 160 that correspond to geographic-location information received from a mobile-client system 130. As an example and not by way of limitation, a user's smartphone may send its latitude-longitude coordinates to social-networking system 160, and social-networking system 160 may identify two or more candidate place-entities within the social-networking system 160, where the candidate place-entities are identified based at least in part on the received latitude-longitude coordinates. In particular embodiments, each candidate place-entity may correspond to a concept node 204 in social graph 200, and each candidate place-entity may represent a particular physical place. As an example and not by way of limitation, each identified candidate place-entity may correspond to a physical place that is associated with a particular geographic location (e.g., a latitude-longitude pair).

In particular embodiments, the social-networking system 160 may search a database of place-entities to identify candidate place-entities. As an example and not by way of limitation, a place-entity database may include a place-identifier and geographic-location information for each place-entity in the database. Additionally, a place-entity database may include signal-information or check-in information associated with each place-entity. In particular embodiments, the social-networking system 160 may use check-in information or signal-information to build up a place-entity database or to model place-entities in the database. As an example and not by way of limitation, when a user checks-in to a place, their smartphone may transmit check-in information along with signal-information about ambient signals (e.g., GPS, Wi-Fi, BLUETOOTH, cellular, or NFC signals) detected or received by the smartphone. The check-in information and the signal-information may be stored in a place-entity database, where it may be combined, correlated, or compared with similar information received from other mobile-client systems.

In particular embodiments, a particular geographic location associated with each identified candidate place-entity may be within a threshold distance of a geographic location of the mobile-client system 130. As an example and not by way of limitation, social-networking system 160 may identify candidate place-entities based at least in part on a distance between the geographic location of the mobile-client system 130 and the particular geographic location associated with a candidate place-entity. Each candidate place-entity may correspond to a place that is located within a particular threshold distance (e.g., within 5 meters, 10 meters, 20 meters, 50 meters, 100 meters, 500 meters, or within any suitable distance) of the mobile-client system 130. As an example and not by way of limitation, if a user is located at LaGuardia airport, social-networking system 160 may identify the airport as a candidate place-entity as well as one or more restaurants, stores, or other place-entities located in the airport and within 25 meters of the user. As another example and not by way of limitation, if a user is located near the Guggenheim Museum in New York City, social-networking system 160 may identify the museum as a candidate place-entity as well as Central Park and one or more other place-entities (e.g., restaurants, stores, hotels, businesses, attractions, or subway stations) located close to the user. Although this disclosure describes particular place-entities identified based on particular information, this disclosure contemplates any suitable place-entities identified based on any suitable information.

FIGS. 3-6 each illustrate an example location-probability distribution associated with a place-entity. In particular embodiments, an online social network may determine, for a candidate place-entity, a confidence score that represents a probability that a user is located at the candidate place-entity. As an example and not by way of limitation, in response to receiving the latitude-longitude coordinates of a user's smartphone, social-networking system 160 may identify a candidate place-entity and determine a probability that the user is located at the candidate place-entity. In particular embodiments, a confidence score may be based at least in part on geographic-location information associated with a mobile-client system 130 and a location-probability distribution associated with a candidate place-entity. A value of a location-probability distribution at a particular geographic location may represent a probability that a user is located at a place associated with the location-probability distribution. As an example and not by way of limitation, if a user is standing at a particular geographic location where a location-probability distribution has a value of 0.7 (or, 70%), then there is a 70% probability that the user is located at the place associated with the location-probability distribution. As another example and not by way of limitation, if, at a particular geographic location where a user is standing, a first place has a location-probability distribution value of 50% and a second place has a location-probability distribution value of 90%, then there is a 50% probability that the user is located at the first place and a 95% probability that the user is located at the second place.

In particular embodiments, a location-probability distribution may be generated by social-networking system 160 based at least in part on check-ins and geographic-location information associated with a place-entity. A set of check-ins associated with a place-entity may act as a proxy for a set of coordinates where users have interacted with the place-entity, and this check-in information may be used to model check-in density for the place-entity. Additionally, check-in information may be used to determine a probability that a user will check-in to the place-entity from a given geographic location. As an example and not by way of limitation, social-networking system 160 may track check-ins associated with a particular place-entity, and the place-entity may be modeled by a location-probability distribution that is based on the geographic location of each of the check-ins. If most of the check-ins are clustered around a particular geographic location, then the place-entity may be modeled as a point. If the check-ins are distributed over a geographic area, then the place-entity may be modeled by a shape or function that approximately mirrors the spatial-distribution of check-ins. Although this disclosure describes and FIGS. 3-6 illustrate particular place-entities associated with particular location-probability distributions, this disclosure contemplates any suitable place-entities associated with any suitable location-probability distributions.

In the example of FIG. 3, place-entity 310 is a house, and place-entity 310 is modeled by a location-probability distribution that is a point 300. In particular embodiments, point 300 may correspond to a particular latitude-longitude pair. In particular embodiments, a location-probability distribution associated with a candidate place-entity 310 may include a point 300, where point 300 corresponds to a particular geographic location of the candidate place-entity 310. As an example and not by way of limitation, place-entity 310 may have a set of associated check-ins that are clustered at or near point 300. In particular embodiments, a confidence score may be based at least in part on a distance between point 300 and a geographic location of a user's mobile-client system 130. As an example and not by way of limitation, if a user is located approximately 2 meters from point 300, then the confidence score that the user is located at place-entity 310 may be 90%. If another user is located approximately 25 meters from point 300, then the confidence score that the user is located at place-entity 310 may be 30%.

In the example of FIG. 4, place-entity 310 is a landmark (e.g., the Eiffel Tower), and place-entity 310 is modeled by a location-probability distribution that is a power-law distribution 320. In particular embodiments, power-law distribution 320 may be referred to as a parameterized distribution. In FIG. 4, power-law distribution 320 is represented as a function in one dimension for the purpose of illustration. In particular embodiments, power-law distribution 320 may be a two-dimensional function (e.g., a function or surface that extends in two or three dimensions and that depends on both x and y coordinates or both latitude and longitude coordinates) or a three-dimensional function (e.g., a function or volume that extends in three dimensions and that depends on x, y, and z coordinates or depends on latitude, longitude, and elevation). In particular embodiments, a location-probability distribution associated with a candidate place-entity 310 may include a power-law distribution 320 centered at a point 330, where point 330 corresponds to a particular geographic location of the candidate place-entity 310. In the example of FIG. 4, point 330 is located at the center of place-entity 310, and power-law distribution 320 has a single peak at point 330 and then falls off smoothly as one moves away from point 330. In particular embodiments, power-law distribution 320 may be expressed as $P(r) = ke^{-(r/r_0)^n}$ or $P(r) = k(1+r/r_0)^{-n}$, where $P(r)$ is power-law distribution 320, k is a scaling factor (e.g., a number from 0 to 1), $r_0$ is a fixed distance parameter, r is a distance from point 330, and n is a positive number. As examples and not by way of limitation, place-entity 310 may be associated with a power-law distribution 320 having a conical shape, an exponential shape, or a Gaussian shape. In particular embodiments, a confidence score may be based at least in part on a value of power-law distribution 320 at a geographic location of a user's mobile-client system 130. As an example and not by way of limitation, a user located at point 330 may be associated with a 95% confidence score that the user is located at place-entity 310, while a user located at point 340 may be associated with a 20% confidence score that the user is located at place-entity 310. Although this disclosure describes and FIG. 4 illustrates particular power-law distributions having particular shapes, this disclosure contemplates any suitable power-law distributions having any suitable shapes.

In the example of FIG. 5, place-entity 310 is a bridge (e.g., the Golden Gate Bridge), and place-entity 310 is modeled by a location-probability distribution that is a kernel density estimate (KDE) 350. In particular embodiments, kernel density estimate 350 may be referred to as a non-parametric distribution. In FIG. 5, kernel density estimate 350 is represented as a function in one dimension for the purpose of illustration. In particular embodiments, kernel density estimate 350 may be a two- or three-dimensional function. In particular embodiments, a location-probability distribution associated with a candidate place-entity 310 may include a kernel density estimate 350 corresponding to a probability density associated with the candidate place-entity 310. As an example and not by way of limitation, kernel density estimate 350 may be based on a spatial distribution of check-ins associated with candidate place-entity 310. Locations having higher numbers of check-ins may have higher KDE values, and locations with fewer numbers of check-ins may have lower KDE values. As an example and not by way of limitation, a store with two entrances may have larger numbers of check-ins clustered near each of the entrances and smaller numbers of check-ins distributed throughout the store. The corresponding KDE for the store may have peaks at each of the two entrances and lower KDE values distributed throughout the store. In FIG. 5, KDE 350 has peaks near each end of the bridge, which may indicate that most people visiting the bridge perform check-ins at parking lots or viewing areas near each end of the bridge. The lower value of KDE across the span of the bridge may indicate a lower relative number of check-ins from people walking across the bridge, with a smaller peak near the middle of the bridge indicating an elevated amount of check-ins near the middle of the bridge. In particular embodiments, a confidence score may be based at least in part on a value of kernel density estimate 350 at a geographic location of a user's mobile-client system 130. As an example and not by way of limitation, a user located at point 360 may be associated with a 95% confidence score that the user is located at place-entity 310, while a user located at point 370 may be associated with a 10% confidence score that the user is located at place-entity 310. In particular embodiments, a KDE 350 for a particular place-entity may be generated from a set of check-ins associated with the place-entity by applying a kernel function to smooth out the discrete set of check-ins. In particular embodiments, the kernel may be any suitable function, such as for example a uniform, triangular, normal, or exponential function, and the bandwidth, or smoothing parameter, may be any suitable distance value, such as for example, 10 meters, 25 meters, or 40 meters. Although this disclosure describes and FIG. 5 illustrates particular kernel density estimates having particular shapes and being based on particular kernels, this disclosure contemplates any suitable kernel density estimates having any suitable shapes and being based on any suitable kernels.

In the example of FIG. 6, place-entity 310 is an airport, and place-entity 310 is modeled by a location-probability distribution that is a polygon 380. In particular embodiments, a location-probability distribution associated with a candidate place-entity 310 may include a polygon 380 representing a shape of the candidate place-entity 310. In particular embodiments, a polygon 380 that represents a shape of a place-entity 380 may refer to a polygon 380 that surrounds, circumscribes, envelopes, or encompasses the place-entity 310. In FIG. 6, place-entity 310 is modeled as a polygon 380 that includes seven straight-line segments encompassing place-entity 310. In particular embodiments, a polygon model may be applied to a popular place-entity (e.g., a place-entity with >100,000 check-ins), and a place-entity may be modeled as an arbitrary shape that is bounded by polygon 380. As an example and not by way of limitation, a polygon model for an airport may encompass the entire airport (including the runways) as well as a car-rental facility located some distance from the airport. As another example and not by way of limitation, a polygon model for a stadium may encompass a parking lot associate with the stadium. In particular embodiments, additional information about other place-entities located within a polygon 380 may be layered over a polygon model. As an example and not by way of limitation, polygon 380 may encompass other place-entities (e.g., restaurants or stores) located within the polygon 380. In particular embodiments, a confidence score may be based at least in part on a geographic location of a mobile-client system 130 with respect to polygon 380. As an example and not by way of limitation, a user located at point 390 may be associated with a 100% confidence score that the user is located at place-entity 310, and a user located at point 400 may also be associated with a 100% confidence score that the user is located at place-entity 310. As another example and not by way of limitation, a user located some distance away from polygon 380 may be associated with a confidence score that decreases as the distance D between the user and polygon 380 increases. In FIG. 6, a user located at point 410 (a distance D from polygon 380) may be associated with a 75% confidence score that the user is located at place-entity 310. In particular embodiments, polygon 380 may have a value of a location-probability distribution that is uniform across an area encompassed by the polygon 380. As an example and not by way of limitation, if a user's geographic location falls anywhere within polygon 380 associated with place-entity 310, then there may be a 100% confidence that the user is located at place-entity 310. Although this disclosure describes and FIG. 6 illustrates particular polygons having particular shapes, this disclosure contemplates any suitable polygons having any suitable shapes.

In particular embodiments, a location-probability distribution for a place-entity 310 may be generated automatically through a machine-learning process. As an example and not by way of limitation, social-networking system 160 may build up or refine a location-probability distribution for a place-entity based at least in part on user check-ins. In particular embodiments, social-networking system 160 may apply a single type of model (e.g., polygon, KDE, or power-law distribution) to place-entities, or a combination of two or more models may be used. As an example and not by way of limitation, modeling of place-entities may be based on a tiered system, such as for example: a place-entity with 0-100 check-ins is modeled as a point; a place-entity with 100-1,000 check-ins is modeled as a power-law distribution; a place-entity with 1,000-100,000 check-ins is modeled as a kernel density estimate; and a place-entity with >100,000 check-ins is modeled as a polygon. This disclosure contemplates any suitable model applied to any suitable place-entity based on any suitable number of associated check-ins.

In particular embodiments, a confidence score may be based at least in part on social-graph information associated with a user. In particular embodiments, a confidence score may be based on a user's geographic location as well as social-graph information associated with the user. As an example and not by way of limitation, a confidence score for a place-entity may be based on a value of an associated location-probability distribution at the user's location and on whether the user has interacted with the place-entity in the past. If the user has previously liked, checked-in to, reviewed, or recommended a particular place-entity, then a confidence score for the place-entity may be adjusted based on the number or type of these past interactions. If a location-probability distribution for a place-entity has a value of 0.7 at the user's location and the user has checked-in to the place-entity one time in the past, then the confidence score may be boosted from 70% to 75% based on the user's previous interaction. If a location-probability distribution for a place-entity has a value of 0.7 at the user's location and the user has previously liked, checked-in to, reviewed, or recommended the place-entity multiple times, then the confidence score may be boosted from 70% to 95% based on the user's previous interactions. If the user has not previously interacted with a particular place-entity, then the confidence score may remain unchanged or may be decreased. If a location-probability distribution for a place-entity has a value of 0.7 at the user's location and the user has not previously interacted with the place-entity, then the resulting confidence score may be 55%. As another example and not by way of limitation, a confidence score for a place-entity may be based on a value of an associated location-probability distribution at the user's location and on an affinity-coefficient value. If an affinity-coefficient value associated with the user and a particular place-entity is above a particular threshold value, then a confidence score for the place-entity may be boosted based on the affinity-coefficient value.

In particular embodiments, a confidence score may be based at least in part on social-graph information associated with two or more users. In particular embodiments, a confidence score for a first user of social-networking system 160 may be based at least in part on social-graph information associated with a second user, where the first user is within a threshold degree of separation from the second user in social graph 200. Two users whose user nodes 202 are connected by an edge 206 may be referred to as having a single degree of separation between them, and two users whose user nodes 202 are connected through another node by two edges 206 may be referred to as having a second degree of separation. As an example and not by way of limitation, if a first user is connected to a second user by a single degree of separation, then a confidence score may be based on the first user's geographic location as well as social-graph information associated with the second user. If the second user has previously liked, check-in to, reviewed, or recommended a particular place-entity, then a confidence score for the place-entity with respect to the first user may be adjusted based on the number or type of the second user's past interactions with the place-entity. As another example and not by way of limitation, if a first user's mobile-client system 130 sends geographic-location information that has a relatively poor accuracy value (e.g., a GPS signal with a 20-meter location accuracy), then social-networking system 160 may identify or boost confidence scores for nearby place-entities that the second user has previously performed a social-graph interaction with. Although this disclosure describes particular confidence scores based on particular social-graph information, this disclosure contemplates any suitable confidence scores based on any suitable social-graph information.

In particular embodiments, a confidence score for a candidate place-entity may be based at least in part on one or more other place-entities which are located nearby the candidate place-entity. As an example and not by way of limitation, if a candidate place-entity is determined to be located near another place-entity that is associated with or related to the candidate place-entity, then the confidence score for the candidate place-entity may be increased. As another example and not by way of limitation, if a user's geographic location corresponds to a hotel place-entity and there is a restaurant place-entity nearby that is associated with the hotel place-entity, then the confidence score for the hotel place-entity with respect to the user may be increased. As another example and not by way of limitation, if a user's geographic location corresponds to a store place-entity and there are several other similar store place-entities located nearby (e.g., the user is at a mall), then the confidence score for the store place-entity with respect to the user may be increased.

In particular embodiments, social-networking system 160 may send, to a mobile-client system 130 of a user, information associated with one or more candidate place-entities having a confidence score above a threshold confidence score. As an example and not by way of limitation, after identifying candidate place-entities and determining confidence scores for the candidate place-entities, social-networking system 160 may send to a user information associated with place-entities having confidence scores above any suitable threshold value (e.g., confidence scores above 80%, 90%, 95%, or 99%). In particular embodiments, social-networking system 160 may send to a user information associated with N place-entities having the highest confidence scores, where N is any suitable positive integer (e.g., 1, 2, 4, or 10). As an example and not by way of limitation, social-networking system 160 may send information associated with one place-entity having the highest confidence score or two place-entities having the two highest confidence scores. In particular embodiments, social-networking system 160 may consider P candidate place-entities and may send information associated with Q place-entities to a user, where P and Q are positive integers, and P≥Q. As an example and not by way of limitation, social-networking system 160 may compare 10 candidate place-entities (e.g., P=10) having the highest confidence scores and may send to the user information associated with one or two of the candidate place-entities (e.g., Q=1 or 2). As another example and not by way of limitation, social-networking system 160 may perform a pairwise comparison of two candidate place-entities (e.g., P=2) having the highest confidence scores and may send to the user information associated with one of the candidate place-entities (e.g., Q=1). In a pairwise comparison, the social-networking system 160 may compare two place-entities, where, as an example, the user is 10 feet away from one place-entity and 100 feet away from the other. The social-networking system 160 may determine that the user is located at the place-entity located 10 feet away and may send information about that place-entity to the user. Although this disclosure describes sending information about particular numbers of place-entities based on particular confidence-score values, this disclosure contemplates sending information about any suitable numbers of place of place-entities based on any suitable confidence-score values.

In particular embodiments, information sent to a mobile-client system 130 of a user may include an advertisement associated with a candidate place-entity having a confidence score above a threshold confidence score. In particular embodiments, after identifying candidate place-entities and determining confidence scores for the candidate place-entities, social-networking system 160 may send an advertisement associated with a candidate place-entity having a confidence score above a threshold value (e.g., confidence score above 80%, 90%, 95%, or 99%). As an example and not by way of limitation, social-networking system 160 may identify a store place-entity having a confidence score of 95%, and social-networking system 160 may send a "buy one, get one free" coupon, a 50% discount offer, or other incentive offer associated with the store place-entity (or possibly a neighbor/competitor of the store place-entity) to the user. In particular embodiments, information sent to a mobile-client system 130 of a user may include a place tip associated with a candidate place-entity, where a place tip may include information about the candidate place-entity or posts or photos the user's friends have shared about the place-entity. As an example and not by way of limitation, social-networking system 160 may identify a restaurant place-entity, and social-networking system 160 may send to the user information about popular menu items or upcoming events associated with the restaurant place-entity. In particular embodiments, social-networking system 160 may send to the user information about a place-entity after the user has selected or interacted with the place-entity. As an example and not by way of limitation, the social-networking system 160 may send a list of place-entities to the user, and the user may select one of the listed place-entities. The social-networking system 160 may then send information about the selected place-entity to the user (e.g., information associated with other friends of the user who have performed social-networking interactions with the same place-entity).

In particular embodiments, information sent to a mobile-client system 130 of a user may include a suggestion to the user to perform an action associated with a candidate place-entity. In particular embodiments, after identifying candidate place-entities and determining confidence scores for the candidate place-entities, social-networking system 160 may send to the user a suggestion to perform an action associated with a candidate place-entity having a confidence score above a threshold value. As an example and not by way of limitation, social-networking system 160 may identify an airport place-entity where the user is located, and social-networking system 160 may send a prompt to the user to update their status, perform a check-in to the airport place-entity, or let their friends know that the user is about to travel somewhere. As another example and not by way of limitation, social-networking system 160 may identify a place-entity where the user is located, and after the user takes a photo, social-networking system 160 may send a suggestion to the user to tag or associate the photo with the identified place-entity. Although this disclosure describes particular information sent to a mobile-client system, this disclosure contemplates any suitable information sent to a mobile-client system.

In particular embodiments, social-networking system 160 may receive, from a mobile-client system 130 of a user, a selection of a candidate place-entity sent to the mobile-client system 130 of the user. As an example and not by way of limitation, social-networking system 160 may send for display on a user's smartphone references to one or more candidate place-entities. A reference to a candidate place-entity may include an icon, picture, or text associated with the place-entity. The user may select a candidate place-entity (e.g., by tapping on a reference to the candidate place-entity), and the user's selection may be sent to the social-networking system 160. In particular embodiments, social-networking system 160 may recalculate, based on a received selection, a location-probability distribution associated with one or more of the candidate place-entities sent to the mobile-client system 130 of the user. As an example and not by way of limitation, a user may select one place-entity from a list of two or more candidate place-entities sent to the user's smartphone, and based on the user's selection, social-networking system 160 may boost or increase one or more values of the location-probability distribution associated with the selected place-entity. Additionally, social-networking system 160 may decrease one or more values of the location-probability distributions associated with the non-selected place-entities. As another example and not by way of limitation, social-networking system 160 may send to a mobile-client system 130 a reference to one candidate place-entity (e.g., a candidate place-entity having a highest confidence score). If the user interacts with the reference or the candidate place-entity (e.g., the user selects, checks-in to, or requests additional information about the candidate place-entity), then social-networking system 160 may boost or increase one or more values of the location-probability distribution associated with the candidate place-entity. If the user discards, deletes, or ignores the reference, or if the user subsequently requests information about a different place-entity, then social-networking system 160 may decrease one or more values of the location-probability distribution associated with the candidate place-entity. In particular embodiments, a model for a place-entity may be tested or refined to ensure its accuracy. As an example and not by way of limitation, social-networking system 160 may send a message to a user based on the user's geographic location, and a place-entity model may be refined based on the user's response (or lack of response) to the message. Social-networking system 160 may send a user an advertisement or a coupon for a place-entity near the user's location, and if the user interacts with the advertisement or coupon, then the location-probability distribution or confidence score associated with the place-entity and the user's location may be increased. If the user ignores, deletes, or does not interact with the message, then the associated location-probability distribution or confidence score may be decreased.

In particular embodiments, social-networking system 160 may receive new geographic-location information associated with a new place-entity, and the social-networking system 160 may generate (e.g., in social graph 200) a new social-graph node (e.g., a concept node 204) corresponding to the new place-entity. As an example and not by way of limitation, social-networking system 160 may create a new place-entity in response to receiving geographic-location information from a threshold number of devices (e.g., mobile-client systems 130) clustered around a particular location. The particular location may not be associated with a place-entity or may have a relatively weak association with another place-entity (e.g., at the particular location, a value of a location-probability distribution of another place-entity may be below a particular threshold value). Additionally, the devices may send to social-networking system 160 information about ambient signals received at or near the particular location, where the ambient-signal information indicates that multiple devices received similar ambient signals (e.g., multiple devices may receive cell signals from the same cell site or Wi-Fi signals from the same wireless access point). In particular embodiments, the new geographic-location information may be sent by multiple client systems 130 associated with users of social-networking system 160, and the social-networking system 160 may create an edge 206 between the new social-graph node 204 and each user node 202 associated with each of the users. In particular embodiments, social-networking system 160 may generate a location-probability distribution associated with the new place-entity. As an example and not by way of limitation, a location-probability distribution may be generated based on the received geographic-location information associated with the new place-entity. If the locations are clustered about a single latitude-longitude pair, then the new place-entity may be modeled as a point or a power-law distribution. If the locations are spatially distributed or have two or more peaks, then the new place-entity may be modeled as a kernel density estimate or a polygon. In particular embodiments, a newly created place-entity may be tested or verified by sending messages to users located at or near the new place-entity. As an example and not by way of limitation, social-networking system 160 may send a place tip, advertisement, or coupon associated with a new place-entity to a user located at or near the new place-entity. A user who interacts with a message associated with a new place-entity may represent a positive interaction or a verification that the new place-entity is valid. A user who deletes or does not interact with the message may represent a negative interaction or an indication that the new place-entity may not be valid.

Figure 7:
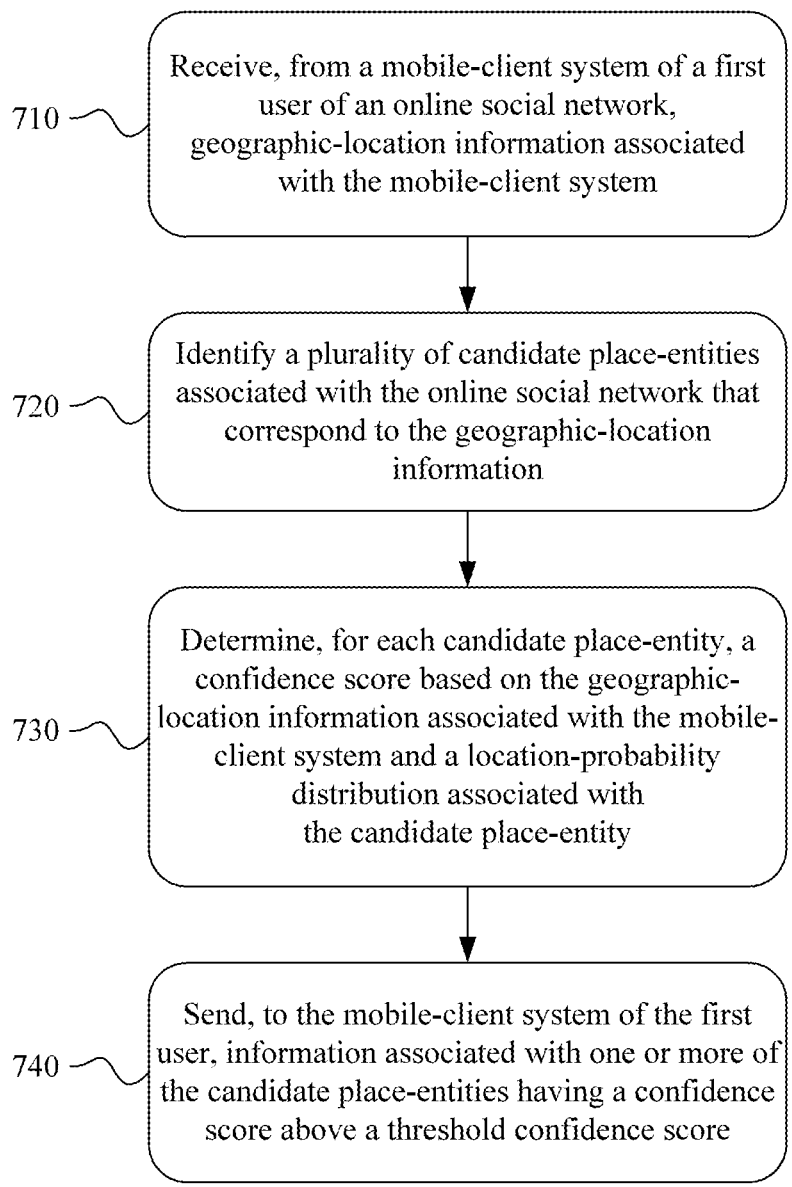
FIG. 7 illustrates an example method 700 for determining place-entities based on geographic-location information.

FIG. 7 illustrates an example method 700 for determining place-entities based on geographic-location information. The method may begin at step 710, where the social-networking system 160 may receive, from a mobile-client system 130 of a first user of the online social network, geographic-location information associated with the mobile-client system 130. As an example and not by way of limitation, the geographic-location information may include a pair of latitude-longitude coordinates corresponding to the location of the mobile-client system 130. At step 720, the social-networking system 160 may identify a plurality of candidate place-entities associated with the online social network that correspond to the geographic-location information. As an example and not by way of limitation, if the latitude-longitude coordinates of the mobile-client system 130 are contained within (or located within a threshold distance of) a polygon of a particular place-entity, then that place-entity may be identified as a candidate place-entity. As another example and not by way of limitation, if a location-probability distribution of another particular place-entity overlaps the latitude-longitude coordinates, then the other place-entity may be identified as a candidate place-entity. In particular embodiments, each candidate place-entity may be associated with a particular geographic location. At step 730, the social-networking system 160 may determine, for each candidate place-entity, a confidence score based on the geographic-location information associated with the mobile-client system 130 and a location-probability distribution associated with the candidate place-entity. In particular embodiments, a confidence score may be further based on social-networking information associated with a user or a candidate place-entity. In particular embodiments, a confidence score may represent a probability that the first user is located at the candidate place-entity. At step 740, the social-networking system 160 may send, to the mobile-client system 130 of the first user, information associated with one or more of the candidate place-entities having a confidence score above a threshold confidence score, at which point the method may end. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for determining place-entities based on geographic-location information including the particular steps of the method of FIG. 7, this disclosure contemplates any suitable method for determining place-entities based on geographic-location information including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Stack Ranking of Places

In particular embodiments, social-networking system 160 may send, to a client system 130 of a user of the online social network, a request to compare two or more place-entities associated with the online social network. As an example and not by way of limitation, social-networking system 160 may send to a client system 130 a request to compare two roller-skating rinks that the user has recently visited. In particular embodiments, a request to compare place-entities may be presented to the user on a webpage of social-networking system 160 or on an interface of a native application associated with social-networking system 160. As an example and not by way of limitation, the client system 130 may be a smartphone with a native application installed on the device that allows the user to access information from or interact with the social-networking system 160. Although this disclosure describes particular requests to compare particular types of entities, this disclosure contemplates any suitable requests to compare any suitable types of entities.

In particular embodiments, the user may be connected to each of two or more place-entities within a social graph 200 of social-networking system 160. As an example and not by way of limitation, social-networking system 160 may send to the user's client system 130 references to two place-entities (e.g., two restaurants or two stores) that the user has previously visited and a request to compare the two place-entities (e.g., indicate which place-entity the user prefers or likes better than the other). In particular embodiments, the user being connected to each of the two or more place-entities within the social graph 200 may correspond to the user having previously performed, via the social-networking system 160, a social-networking interaction with each of the place-entities. As an example and not by way of limitation, a social-networking interaction may include a check-in, a like, or a review submitted by the first user. As another example and not by way of limitation, social-networking system 160 may send to the user's client system 130 a request to compare three bowling alleys that the user has previously visited and interacted with through the social-networking system 160 (e.g., the user has previously checked-in to, liked, or reviewed each bowling alley). The user may be asked to select which of the three bowling alleys is her favorite, or the request may ask that the user rank the three bowling alleys in order of preference. As another example and not by way of limitation, the user may be connected to each of the two or more place-entities such that there is a single degree of separation between the user and each place-entity. The user may correspond to a user node 202 in social graph 200, and each place-entity may have a corresponding concept node 204 which, for a single degree of separation, is connected by a single edge 206 to the user node 202. Although this disclosure describes particular connections between particular users and particular place-entities, this disclosure contemplates any suitable connections between any suitable users and any suitable place-entities.

In particular embodiments, each place-entity may be associated with a particular score on a scoring scale. As an example and not by way of limitation, users of the social-networking system 160 may post reviews or ratings of various place-entities, and the reviews or ratings may include a score on a scoring scale (e.g., a numerical score on a scoring scale from 1 to 10; a percentage score on a scoring scale from 0% to 100%; a "star" score on a scoring scale from 0 to 5 stars; or any other suitable scoring scale). In particular embodiments, each place-entity may be associated with a particular score on a scoring scale, where the particular score may correspond to an average of multiple scores submitted by users. As an example and not by way of limitation, 75 users of the social-networking system 160 may submit ratings for Sancho's Taqueria on a zero-star to five-star scoring scale, and the average score may be 4.5 stars out of 5 stars. In particular embodiments, each place-entity being associated with a particular score on a scoring scale may correspond to each place-entity having a score on the scoring scale equal to the particular score. As an example and not by way of limitation, social-networking system 160 may send to a client system 130 of a user a request to compare two restaurants, where both restaurants have the same average score (e.g., 4.5 stars) based on reviews by users of the social-networking system 160. As another example and not by way of limitation, social-networking system 160 may send to a user a request to compare two restaurants, where the user has given both restaurants the same score (e.g., the user has posted reviews for both restaurants and given both restaurants a four-star rating). In particular embodiments, each place-entity being associated with a particular score on a scoring scale may correspond to each place-entity having a score on the scoring scale within a threshold of the particular score. As an example and not by way of limitation, each place-entity having a score on the scoring scale within a threshold of the particular score may correspond to the score being within a particular percentage (e.g., within 1%, 5%, 10%, or within any suitable percentage) of the particular score. As another example and not by way of limitation, social-networking system 160 may send to a user a request to compare two restaurants, where one restaurant has an average score of 4.4 stars and the other restaurant has an average score of 4.6 stars. The scores for the two restaurants are each within 2.5% of a 4.5-star score. Although this disclosure describes particular place-entities associated with particular scores and particular scoring scales, this disclosure contemplates any suitable place-entities associated with any suitable scores and any suitable scoring scales.

In particular embodiments, each place-entity may be associated with a particular feature. As an example and not by way of limitation, social-networking system 160 may send to a client system 130 of a user a request to compare two restaurants, where both restaurants have approximately the same score or ranking and both restaurants have one or more features in common. In particular embodiments, a feature may include an attribute, type, descriptor, or characteristic associated with a place-entity. As an example and not by way of limitation, a feature may include a number of likes, a number of check-ins, a number of visits, or a score associated with a place-entity. As another example and not by way of limitation, a feature may include a description or characteristic of a place-entity, such as for example a store place-entity may have a feature "grocery store," "shoe store," or "bicycle store," and a business place-entity may have a feature "dry cleaner," "auto repair," or "solar-panel installer." As another example and not by way of limitation, a restaurant place-entity may have features that include price (e.g., average price of entrees), location, noise level, type of food served (e.g., Italian, Chinese, Mexican), operating hours, service type (e.g., sit-down service, counter order, or take out), or ambience (e.g., casual, dressy, or outdoor seating). In particular embodiments, a feature may include user-specific features, such as for example features tailored to or based on a user's age, gender, location, preferences, or social-networking information associated with the user. As an example and not by way of limitation, a user-specific feature for a restaurant may include the user's location relative to the restaurant or the user's food preference (e.g., the user may prefer sushi instead of Mexican food). In particular embodiments, social-networking system 160 may send to a client system 130 of a user a request to compare two place-entities, where the two place-entities share one or more features. As an example and not by way of limitation, social-networking system 160 may send a request to compare two restaurant place-entities. As another example and not by way of limitation, social-networking system 160 may send a request to compare two restaurants both of which serve Italian food and are located in the same neighborhood. In particular embodiments, social-networking system 160 may send to a client system 130 of a user a request to compare two place-entities, where the two place-entities have approximately the same score and share one or more particular features, and the user has visited or interacted with (e.g., via social-networking system 160) both place-entities. As an example and not by way of limitation, social-networking system 160 may send a request to compare two restaurants, where both restaurants serve Sunday brunch and have a score of approximately 4.3 stars, and the user has checked-in to or reviewed both restaurants. Although this disclosure describes particular place-entities having particular features, this disclosure contemplates any suitable place-entities having any suitable features.

In particular embodiments, social-networking system 160 may send to a client system 130 of a user a request to compare any suitable number of place-entities (e.g., 2, 3, 4, 5, or 10 place-entities). As an example and not by way of limitation, a request sent to a client system 130 may present references to two place-entities and ask that the user select which place-entity they prefer. As another example and not by way of limitation, a request may present references to three place-entities to a user and ask that the user select one place-entity that they prefer the most. As another example and not by way of limitation, a request may present references to three place-entities to a user and ask the user to rank the place-entities in order of preference (e.g., first, second, and third). As another example and not by way of limitation, a request may present references to five place-entities to a user and ask the user to select their top two preferred place-entities out of the five place-entities presented.

Although this disclosure describes particular requests that include particular numbers of place-entities, this disclosure contemplates any suitable requests that include any suitable numbers of place-entities.

In particular embodiments, social-networking system 160 may receive, from a client system 130 of a user, comparison information responsive to a request, the comparison information indicating an ordered ranking of two or more place-entities. As an example and not by way of limitation, after sending, to a user's client system 130, a request to compare two or more place-entities, social-networking system 160 may receive a response from the user indicating which place-entity the user considers to be better or which place-entity is preferred by the user. If the user selects place-entity X when presented with place-entities X and Y, then the ordered ranking is X (first) and Y (second). In particular embodiments, an ordered ranking of place-entities may include a selection of one or more place-entities or a relative preference of two or more place-entities. As an example and not by way of limitation, a request may include two place-entities, and the user may indicate an ordered ranking by tapping on, swiping, or selecting a reference to one of the place-entities. As another example and not by way of limitation, a request may include three or more place-entities, and the ordered ranking may include an indication of the user's top-three preferences (e.g., the user's first, second, and third choices from a list of three or more place-entities). In particular embodiments, a request sent to a client system 130 of a user may include a request to compare two place-entities, and comparison information received from the client system 130 may include an indication of which place-entity, of the two place-entities, the user prefers. As an example and not by way of limitation, social-networking system 160 may send a request to a user's client system 130 to compare two place-entities the user has recently visited (e.g., Central Park and Times Square), and the user may send back a response indicating which place-entity they like more than the other. If the user selects Central Park, then the ordered ranking is Central Park (first) and Times Square (second). In particular embodiments, a request to compare two place-entities may be referred to as a pairwise comparison. Although this disclosure describes particular comparison information indicating particular ordered rankings of place-entities, this disclosure contemplates any suitable comparison information indicating any suitable ordered rankings of place-entities.

In particular embodiments, social-networking system 160 may receive comparison information from multiple users of the social-networking system 160. As an example and not by way of limitation, social-networking system 160 may send requests to multiple users of the social-networking system 160, each request asking a user to compare two or more place-entities that the user has visited or interacted with via the social-networking system 160. In particular embodiments, the social-networking system 160 may send the same request to multiple users. As an example and not by way of limitation, the social-networking system 160 may send a request to two or more users to compare place-entity A and place-entity B, and the social-networking system 160 may receive from one or more of the users comparison information indicating whether they prefer place-entity A or place-entity B. If social-networking system 160 receives comparison information indicating that 75 users prefer place-entity A and 25 users prefer place-entity B, then the social-networking system 160 may boost a ranking or score of place-entity A relative to place-entity B. In particular embodiments, the social-networking system 160 may send multiple requests to multiple users of the social-networking system 160, where one or more of the requests may be different from one or more other requests. As an example and not by way of limitation, the social-networking system 160 may send a first request to compare place-entities A and B, a second request to compare place-entities B and C, and a third request to compare place-entities A and C. The first, second, and third requests may be sent to different users, and the received comparison information may be combined to adjust or determine a relative ranking or score for each of the place-entities A, B, and C.

In particular embodiments, social-networking system 160 may access a scored list of place-entities associated with the social-networking system 160. As an example and not by way of limitation, a scored list of place-entities may include a list of two or more place-entities, each place-entity associated with a score on a scoring scale. As another example and not by way of limitation, the place-entities of a scored list may be ranked or ordered based on their respective scores. In particular embodiments, a scored list may include place-entities that are similar or share one or more features. As an example and not by way of limitation, a scored list may include place-entities that are restaurants (e.g., each place-entity includes the feature "restaurant") or restaurants in Chicago (e.g., each place-entity includes the features "restaurant" and "location: Chicago"). An example scored list of restaurant place-entities may include place-entity names and associated scores, such as for example, Joe's Deli (4.8 stars); Sancho's Taqueria (4.5 stars); Sushi Palace (4.4 stars); and The Krusty Krab (4.4 stars). In particular embodiments, a scored list may include place-entities that have different features. As an example and not by way of limitation, a scored list may include a list of restaurants, stores, businesses, museums, or any suitable combination of place-entities having any suitable features. Although this disclosure describes particular scored lists that include particular place-entities having particular features, this disclosure contemplates any suitable scored lists that include any suitable place-entities having any suitable features.

In particular embodiments, a scored list may be filtered to access place-entities having particular features. As an example and not by way of limitation, a scored list may be filtered to access place-entities that have a particular feature or combination of features (e.g., restaurant; sushi restaurant; restaurants with scores greater than 4 stars; restaurants with scores within 1% of 4.5 stars; restaurants with the same score; or restaurants with the same score that have been visited by a particular user). In particular embodiments, social-networking system 160 may send to a user a request to compare two or more place-entities, and social-networking system 160 may also access a scored list of place-entities, where the place-entities of the scored list include at least the two or more place-entities of the request sent to the user. As an example and not by way of limitation, social-networking system 160 may send to a user a request to compare two restaurants (e.g., two Japanese restaurants that the user has visited and that have the same score), and social-networking system 160 may access a scored list of restaurant place-entities that includes at least the two restaurants. In particular embodiments, social-networking system 160 may access a scored list of place-entities that includes place-entities having the same score. As an example and not by way of limitation, social-networking system 160 may send to a user a request to compare two businesses that both have scores of 4.5 stars out of 5 stars. In particular embodiments, a scored list of place-entities may include approximately $10^K$ place-entities, where K is 1, 2, 4, 6, 8, or any suitable positive number. As an example and not by way of limitation, a scored list may include approximately 10, 100, 10,000, 1,000,000, or any suitable number of place-entities. Although this disclosure describes particular scored lists that include particular numbers of place-entities, this disclosure contemplates any suitable scored lists that include any suitable numbers of place-entities.

In particular embodiments, social-networking system 160 may rank a scored list of place-entities based at least in part on scores on a scoring scale and comparison information. As an example and not by way of limitation, social-networking system 160 may rank a scored list of place-entities based at least in part on comparison information received from one or more users of the social-networking system 160. As another example and not by way of limitation, social-networking system 160 may determine a scored list of place-entities based at least in part on scores for the place-entities (e.g., scores from user reviews), and the scored list may be ranked based at least in part on comparison information. In particular embodiments, ranking a scored list of place-entities may refer to determining or adjusting an order of place-entities. As an example and not by way of limitation, a scored list of place-entities may be ranked based on scores associated with each place-entity so that the place-entities are ranked in accordance with their scores (e.g., place-entities with the highest scores are ranked first followed by place-entities with lower scores, in order of the scores). In particular embodiments, a scored list of place-entities may be adjusted based on comparison information received from users. As an example and not by way of limitation, social-networking system 160 may access a scored list that includes place-entities P and Q, each place-entity having a score of 4 stars. In response to a pairwise comparison where a user indicates that they prefer place-entity Q over P, social-networking system 160 may produce a ranked list where the two place-entities are ranked in order "Q P" (e.g., place-entity Q is ranked higher than place-entity P).

In particular embodiments, a ranked list of place-entities may include two or more place-entities about which comparison information was received from multiple users of social-networking system 160. As an example and not by way of limitation, a ranked list may include 100,000 place-entities, and the ranked list may be determined based at least in part on comparison information received from 1,000,000 users. In particular embodiments, social-networking system 160 may rank a scored list of place-entities based at least in part on scores on a scoring scale and comparison information received from multiple users. As an example and not by way of limitation, a scored list may include place-entities A, B, and C with scores 4.7 stars, 4.6 stars, and 4.5 stars, respectively. Initially, these place-entities may be ranked in order "A B C," based on their scores. After receiving comparison information from users (e.g., 75% of the users prefer place-entity B over A, and 80% of the users prefer place-entity A over C), social-networking system 160 may adjust the ranking to produce a ranked list with the place-entities ranked as "B A C." As another example and not by way of limitation, a scored list may include place-entities X, Y, and Z, each having a score of 4.5 stars. After receiving comparison information from users (e.g., 90% of the users prefer place-entity Z over Y, and 70% of the users prefer place-entity X over Y), the place-entities may be ranked, based on the comparison information, in order "Z X Y." In particular embodiments, comparison information may be used to distinguish between place-entities that have similar scores. As an example and not by way of limitation, the top 10 restaurants in San Francisco may all have ratings close to 4.9 stars, and these 10 restaurants may be ranked relative to one another based at least in part on comparison information.

In particular embodiments, ranking a scored list of place-entities may include performing a topological sorting operation or a linearization algorithm based on comparison information received from multiple users of social-networking system 160. As an example and not by way of limitation, social-networking system 160 may receive pairwise place-entity comparison information from multiple users, and social-networking system 160 may rank the place-entities based at least in part on maximizing the number of correctly ordered pairs (or minimizing the number of incorrectly ordered pairs) within the ranked list. If 75 users prefer place-entity A over place-entity B, and 25 users prefer place-entity B over place-entity A, social-networking system 160 may rank place-entity A higher than place-entity B. Although this disclosure describes particular scored lists ranked in particular manners based on particular comparison information, this disclosure contemplates any suitable scored lists ranked in any suitable manners based on any suitable comparison information.

In particular embodiments, social-networking system 160 may receive a request for a list of top N place-entities having one or more particular features, where N is a positive integer, and social-networking system 160 may filter a ranked list based on the particular features to determine the top N place-entities having the particular features. As an example and not by way of limitation, a user may send a request to social-networking system 160 for the 5 top-ranked Ethiopian restaurants in Chicago. The particular features associated with this request may include "place-entity type: restaurant," "type of food: Ethiopian," and "location: Chicago." In response to the request, social-networking system 160 may access a ranked list of place-entities and filter the list based on the features. As an example and not by way of limitation, social-networking system 160 may access a ranked list of place-entities and select only the place-entities with the features "restaurant," "Ethiopian," and "Chicago." As another example and not by way of limitation, social-networking system 160 may access a ranked list of restaurant place-entities and remove from consideration any place-entities that do not include the features "Ethiopian" and "Chicago." After the ranked list is filtered, references to the top-five place-entities (e.g., the five place-entities having the highest ranking) may be sent to the user. Although this disclosure describes particular ranked lists that are filtered based on particular features, this disclosure contemplates any suitable ranked lists that are filtered based on any suitable features.

In particular embodiments, social-networking system 160 may receive a request for a list of top N place-entities near a particular location, where N is a positive integer, and social-networking system 160 may filter a ranked list to determine the top N place-entities having a location within a threshold distance from the particular location (e.g., within 20 m, 100 m, 1 km, 10 km, or within any suitable distance). As an example and not by way of limitation, a user may send a request to social-networking system 160 for three top-ranked bakeries near the user's current location. In response to the request, social-networking system 160 may access a ranked list of place-entities and filter the list based at least in part on the user's current location. As an example and not by way of limitation, social-networking system 160 may access a ranked list of place-entities and select three top-ranked place-entities with the feature "business: bakery" and having a location within 500 meters of the user's location. As another example and not by way of limitation, social-networking system 160 may access a ranked list of bakeries and select three top-ranked bakeries that are closest to the user's current location. Although this disclosure describes particular ranked lists filtered based on particular location information, this disclosure contemplates any suitable ranked lists filtered based on any suitable location information.

In particular embodiments, social-networking system 160 may determine a place-classifier algorithm based at least in part on a ranked list of place-entities. As an example and not by way of limitation, a ranked list of place-entities and one or more features associated with each place-entity of the ranked list may be used as input data for training a classifier. In particular embodiments, a classifier algorithm may be used to predict a score or a ranking for a place-entity. As an example and not by way of limitation, a ranked list of restaurant place-entities along with features of the place-entities may be used to train a restaurant classifier. Then, the restaurant classifier may be used to provide a predicted score or ranking for one or more restaurant place-entities that were not part of the ranked list used to train the classifier. In particular embodiments, a classifier algorithm may be used to predict a rank of a new place-entity relative to place-entities of a ranked list. As an example and not by way of limitation, a classifier algorithm may be used to predict that a new restaurant place-entity W may be ranked below place-entity X and above place-entity Y. In particular embodiments, social-networking system 160 may apply a place-classifier algorithm to predict a result of a pairwise comparison of two place-entities presented to a user. As an example and not by way of limitation, a classifier algorithm may be used to determine that in a pairwise comparison between place-entities R and S, place-entity R has an 80% probability of being selected by a user as the preferred place-entity, and place-entity S has a 20% probability of being selected by the user as preferred. As another example and not by way of limitation, a classifier algorithm may be used to predict that in a pairwise comparison, 80% of users will indicate they prefer place-entity R, and 20% of users will indicate they prefer place-entity S. In particular embodiments, social-networking system 160 may apply a place-classifier algorithm to generate a list of top-ranked place-entities. As an example and not by way of limitation, in response to a query from a user for the "top X in Y" (e.g., the top five restaurants in Boston; the top parks near the user; or the top beaches in Oregon), a classifier algorithm may analyze place-entities and their associated features to produce a list of top place-entities to send to the user. Although this disclosure describes particular place-classifier algorithms configured to provide particular predictions or lists, this disclosure contemplates any suitable place-classifier algorithms configured to provide any suitable predictions or lists.

In particular embodiments, social-networking system 160 may determine a place-classifier algorithm that is a global classifier configured to generate a non-personalized list of place-entities based at least in part on global features of the place-entities. As an example and not by way of limitation, global features may include features that are common, uniform, or not specific to a particular user, such as for example, a number of check-ins, a number of likes, a score, a descriptor (e.g., "restaurant" or "sushi restaurant"), or a location associated with a place-entity. In particular embodiments, a global classifier may be used to predict how a group of users will respond to a pairwise comparison (e.g., predict that 60% of users will prefer place A over place B) or to provide a "top X in Y" list to a group of users. In particular embodiments, social-networking system 160 may determine a place-classifier algorithm that is a personalized classifier configured to generate a list of place-entities customized for a particular user based at least in part on user-specific features. As an example and not by way of limitation, a personalized classifier may be determined for a particular user based on global features as well as user-specific features (e.g., the user's age, gender, location, or preferences, or social-networking information associated with the user). As another example and not by way of limitation, an existing global classifier may be modified or tailored to a specific user by applying one or more user-specific features to the global classifier. In particular embodiments, a personalized classifier may be used to predict how a particular user will respond to a pairwise comparison or to provide a "top X in Y" list that is tailored to a particular user. As an example and not by way of limitation, if a user has indicated (e.g., based on their likes, check-ins, or reviews) that they prefer casual, outdoor dining, then a personalized restaurant classifier may be tailored to boost or emphasize restaurants that offer this type of dining experience. As another example and not by way of limitation, a personalized classifier for a particular user may boost or emphasize place-entities based on the preferences of other users (e.g., other users who share similar profiles with the particular user or other users who are within a threshold degree of separation from the particular user). Although this disclosure describes particular place-classifier algorithms determined in particular manners, this disclosure contemplates any suitable place-classifier algorithms determined in any suitable manners.

Figure 8:
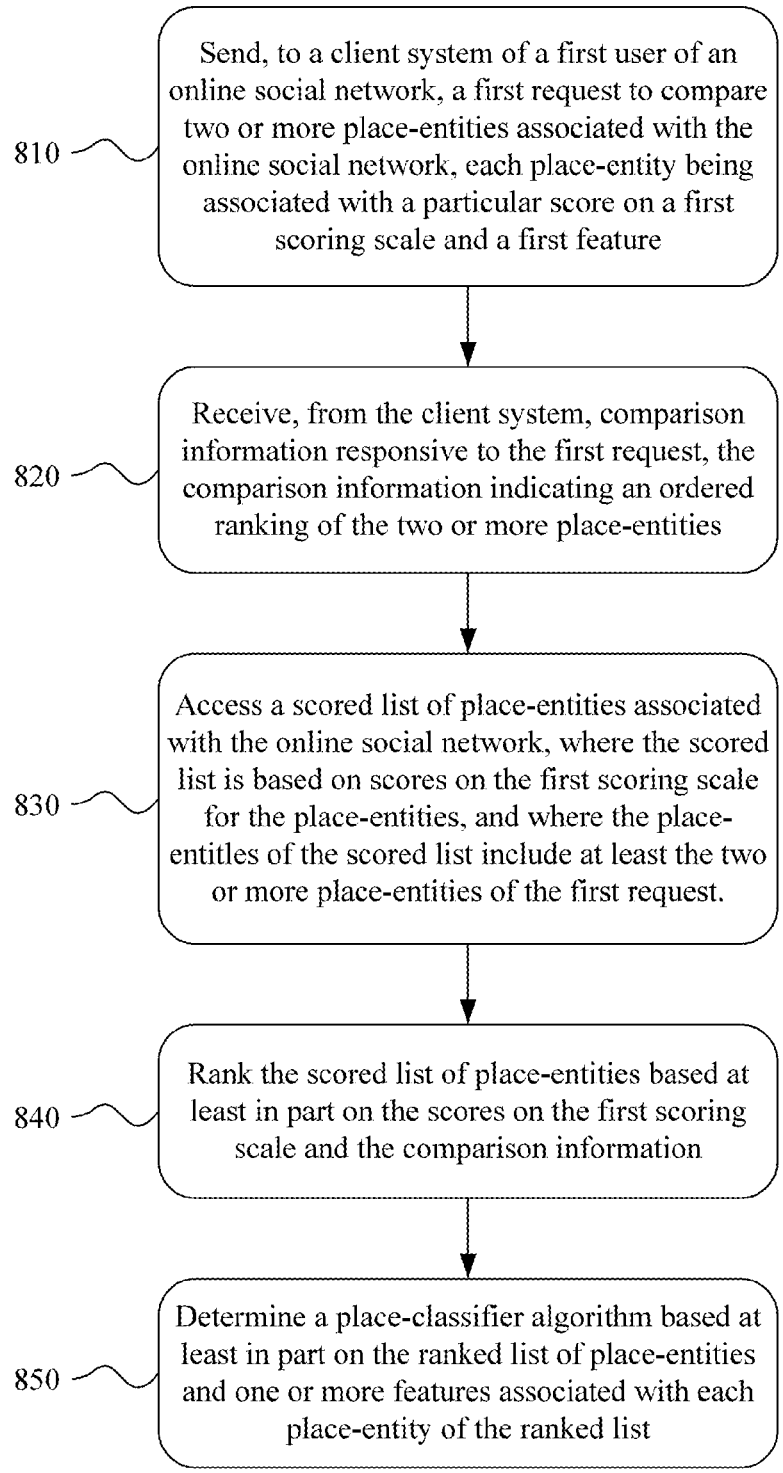
FIG. 8 illustrates an example method for ranking place-entities.

FIG. 8 illustrates an example method 800 for ranking place-entities. The method may begin at step 810, where the social-networking system 160 may send, to a client system 130 of a first user of the online social network, a first request to compare two or more place-entities associated with the online social network, each place-entity being associated with a particular score on a first scoring scale and a first feature. In particular embodiments, the first user may be connected to each place-entity within a social graph 200 of the social-networking system 160. At step 820, the social-networking system 160 may receive, from the client system 130, comparison information responsive to the first request, the comparison information indicating an ordered ranking of the two or more place-entities. At step 830, the social-networking system 160 may access a scored list of place-entities associated with the online social network, where the scored list is based on scores on the first scoring scale for the place-entities, and where the place-entitles of the scored list include at least the two or more place-entities of the first request. At step 840, the social-networking system 160 may rank the scored list of place-entities based at least in part on the scores on the first scoring scale and the comparison information. In particular embodiments, the ranked list of place-entities may include at least the two or more place-entities of the first request. At step 850, the social-networking system 160 may determine a place-classifier algorithm based at least in part on the ranked list of place-entities and one or more features associated with each place-entity of the ranked list, at which point the method may end. In particular embodiments, the one or more features may include at least the first feature. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for ranking place-entities including the particular steps of the method of FIG. 8, this disclosure contemplates any suitable method for ranking place-entities including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Suppressing Place Suggestions

In particular embodiments, the social-networking system 160 may receive, from a client system 130 of a user of the online social network, a query inputted by the user. As an example and not by way of limitation, a user may send, via their smartphone, a query to social-networking system 160 requesting information about a person, a place, or another entity associated with the online social network. As another example and not by way of limitation, a user who is looking for Big Apple Cleaners may send the query "big apple" or "big apple cleaners" to the social-networking system 160. As another example and not by way of limitation, a user who is looking for information about New York City may send the query "big apple" or "new york" to the social-networking system 160. As another example and not by way of limitation, a user who is looking for information about Stanford University may send the query "stanford" or "stanford university" to the social-networking system 160. As another example and not by way of limitation, a user who is looking for information about Stanford Hospital may send the query "stanford" or "stanford hospital." As another example and not by way of limitation, a user who is looking for information about the driving range at Stanford University Golf Course may send the query "stanford driving" or "stanford driving range," while a user looking for information about Stanford Driving School may send the query "stanford driving" or "stanford driving school." Although this disclosure describes particular queries that include particular requests for information, this disclosure contemplates any suitable queries that include any suitable requests for information.

In particular embodiments, the social-networking system 160 may identify multiple entities matching a query. As an example and not by way of limitation, in response to receiving a query from a user, the social-networking system 160 may identify two or more entities that match the user's query. As another example and not by way of limitation, in response to a query that includes "big apple," the social-networking system 160 may identify "New York City" (a city), "The Big Apple" (a page related to New York City), "Big Apple Circus" (a business), "Big Apple Cleaners" (another business), and "Big Apple Donuts & Coffee" (a restaurant) as entities that match the query. As another example and not by way of limitation, in response to the query "paris," the social-networking system 160 may identify "Paris, France" (a city), "Paris, Texas" (another city), "The University of Paris" (a university), "Paris Hilton" (a celebrity), and "Paris Las Vegas" (a hotel) as entities that match the query. In particular embodiments, each node in social graph 200 may correspond to an entity associated with the social-networking system 160. An identified entity that matches a query may be referred to herein as a suggested entity or an entity suggestion.

In particular embodiments, each identified entity may have a duplication-value with respect to a canonical-entity. A duplication-value associated with two entities may be a pairwise score between the two entities indicating a likelihood that the two entities are duplicates (e.g., the two entities represent or correspond to the same place, user, or concept). As an example and not by way of limitation, a duplication-value may be a positive or negative number, where a pair of entities with a positive duplication-value indicates that the two entities are likely to be duplicates (e.g., the likelihood may be proportional to the magnitude of the duplication-value), and a negative duplication-value indicates that the two entities are likely to be distinct (e.g., they are not duplicates). As another example and not by way of limitation, a duplication-value may be a number on a scale from 0 to 1 (or 0% to 100%), where a duplication-value of 0 indicates that the two entities are distinct and are not duplicates, and a duplication-value of 1 indicates that the two entities are duplicates and correspond to the same entity. A duplication-value of 0.2 (or 20%) may indicate a 20% probability that two entities are duplicates, while a duplication-value of 0.8 may indicate an 80% probability that two entities are duplicates. As an example and not by way of limitation, the entities "New York City" and "Big Apple Cleaners" may have a duplication-value of 0.1, indicating that the two entities likely correspond to two separate, distinct entities. As another example and not by way of limitation, the entities "New York City" and "The Big Apple" may have a duplication-value of 0.9, indicating that the two entities likely correspond to the same entity. In particular embodiments, two entities may be duplicates, but one entity may be a preferred entity of the two entities. As an example and not by way of limitation, an official page for Guinness beer and a personal page entitled "Sam's Tribute to Guinness" may be considered duplicate pages, and the official Guinness page may be preferred over the other page.

In particular embodiments, in response to receiving a query from a user, the social-networking system 160 may identify two or more entities that match the user's query (e.g., by searching a reverse index for entities indexed with terms matching the user's query), where the identified entities each have a duplication-value with respect to a canonical-entity. In particular embodiments, a canonical-entity may represent an optimal, preferred, or exemplary entity with respect to a group of related entities or with respect to a particular search term, keyword, or topic. As an example and not by way of limitation, there may be over one thousand entities that correspond to Stanford University (e.g., over 1,000 "Stanford University" concept nodes 204 in social graph 200), and an official page for Stanford University may be designated as a canonical-entity with respect to the other entities or the search terms "stanford" or "stanford university." Each of the over 1,000 entities may have a particular duplication-value with respect to the official Stanford University page (e.g., a particular duplication-value may be above or below a threshold duplication-value). In particular embodiments, a canonical-entity may be identified based at least in part on social-networking information. As an example and not by way of limitation, of the over 1,000 "Stanford University" concept nodes 204 in social graph 200, the official Stanford University page may have the greatest number of likes or page views. Although this disclosure describes particular entities associated with particular duplication-values and particular canonical-entities, this disclosure contemplates any suitable entities associated with any suitable duplication-values and any suitable canonical-entities.

In particular embodiments, a duplication-value may be based on a name similarity between an identified entity and a canonical-entity. As an example and not by way of limitation, social-networking system 160 may determine a duplication-value based at least in part on the similarity between the names of two entities. An identified entity "New York Pizza" (a restaurant) and a canonical-entity "New York City" (a city) may have a duplication-value of 0.6 on a scale of 0 to 1. As another example and not by way of limitation, with respect to the entity "Stanford University" (a university) the entities "Stanford University Golf Course" (a golf course) and "Stamford, Conn." (a city) may have duplication-values of 0.8 and 0.2, respectively. In particular embodiments, name similarity may be based on the number or percentage of words that match between the names of two entities. As an example and not by way of limitation, two entities may have a relatively high degree of name similarity if 75% of the words in their names match or if two or more words in their names match. In particular embodiments, a match between words may be based on a particular percentage or number of letters being the same. As an example and not by way of limitation, "stanford" and "stamford" may be considered matching words or closely matching words, and "color" and "colour" may be considered matching words or closely matching words.

In particular embodiments, a duplication-value may be based at least in part on a geographic location or distance associated with an identified entity or a canonical-entity. As an example and not by way of limitation, a duplication-value may decrease as the distance between an identified entity and a canonical-entity increases. Two places located 1,000 miles apart may have a lower duplication-value than two places located within 1 mile of each other. As another example and not by way of limitation, a duplication-value between "Paris, France" and "Paris, Texas" (which are over 4,000 miles apart) may be lower than a duplication-value between "Paris, France" and "The University of Paris" (which are within the same geographic location). As another example and not by way of limitation, based on distances between entities, a duplication-value of "Venice, Italy" (a city in Italy) with respect to "Venice Beach" (a city located in California) may be lower than a duplication-value of "Inn at Venice Beach" (a hotel located near Venice Beach) with respect to "Venice Beach."

In particular embodiments, a duplication-value may be based at least in part on a number of check-ins, likes, or reviews associated with an entity. As an example and not by way of limitation, two entities which both received more than 1,000 check-ins may have a relatively low duplication-value relative to one another since they may each represent a distinct entity. The entities "Stanford University" and "Stanford Shopping Center" (a mall) may separately receive a significant amount of social-network interactions and, accordingly, may have a relatively low duplication-value. As another example and not by way of limitation, an entity with more than 1,000 check-ins may have a relatively high duplication-value relative to another entity with less than 50 check-ins. The entities "Stanford University" and "Fred's Stanford Fan Page" (a personal page made by a fan of Stanford University) may have a relatively high duplication-value since "Fred's Stanford Fan Page" may receive a relatively low amount of check-ins, likes, or reviews.

In particular embodiments, a duplication-value may be based at least in part on crowdsourcing votes or redirects associated with an identified entity. As an example and not by way of limitation, a duplication-value may be based at least in part on crowdsourcing votes where user feedback provides information as to whether two entities are duplicates. The social-networking system 160 may send references to two entities to a user's client system 130, and a duplication-value for the two entities may be determined or adjusted based on the user's feedback. When presented with references to entities X and Y, if most users select or interact with entity X (e.g., 90% select or interact with entity X), then social-networking system 160 may determine that entities X and Y are likely duplicates. Additionally, social-networking system 160 may determine that entity X is a preferred entity or a canonical-entity. When presented with references to entities W and X, if users interact approximately equally with the two entities (e.g., 40% select entity W and 60% select entity X), then social-networking system 160 may determine a relatively low duplication-value for the two entities since they may each represent a distinct entity. As another example and not by way of limitation, a duplication-value may be based at least in part on redirects associated with one or more entities. If a user searches for entity V and is redirected to entity W, then entity V and W may be duplicates, and social-networking system 160 may assign a relatively high duplication-value to them. In particular embodiments, social-networking system 160 may determine a duplication-value based at least in part on one or more factors, such as for example, name similarity, location or distance, social-network interactions (e.g., check-ins, likes, or reviews), crowdsourcing votes, or redirects. As an example and not by way of limitation, a duplication-value may be based on name similarity and a distance between entities. If two entities have names with a high degree of name similarity and are located relatively close to one another (e.g., within 100 feet, 1 mile, 10 miles, or within any suitable distance), then they may have a relatively high duplication-value. Although this disclosure describes particular duplication-values based on particular factors, this disclosure contemplates any suitable duplication-values based on any suitable factors.

In particular embodiments, the social-networking system 160 may suppress one or more entities based on duplication-values or social-graph information. In particular embodiments, after identifying multiple entities in response to receiving a query from a user, the social-networking system 160 may suppress an identified entity based at least in part on a duplication-value of the entity with respect to a canonical-entity. As an example and not by way of limitation, the social-networking system 160 may suppress an entity having a duplication-value with respect to a canonical-entity above a threshold duplication-value. If a threshold duplication-value is 0.75 and the entity "Joe's Big Apple Page" (a personal page related to New York City) has a duplication-value of 0.8 (on a scale of 0 to 1) with respect to a canonical-entity "New York City," then "Joe's Big Apple Page" may be suppressed. In particular embodiments, the duplication-value associated with a non-suppressed entity may be below a threshold-duplication value. As an example and not by way of limitation, if the entity "New York Pizza" has a duplication-value of 0.4 with respect to the entity "New York City," then social-networking system 160 may refrain from suppressing the "New York Pizza" entity. In particular embodiments, non-suppressed entities may include entities which are possible duplicate-entities having duplication-values above a threshold duplication-value. As an example and not by way of limitation, if the entity "The Big Apple" has a duplication-value of 0.8 with respect to the entity "New York City," then social-networking system 160 may refrain from suppressing the entity "The Big Apple." In particular embodiments, suppression of an entity may refer to removing the entity from consideration. As an example and not by way of limitation, the social-networking system 160 may identify multiple entities in response to a user's query, and if an entity of the identified entities is suppressed, it may be removed from consideration and not sent to the user. Similarly, if an entity is not suppressed, it may be sent to the user as part of a search-results page. In particular embodiments, suppression of identified entities may be referred to as suppressing entity suggestions. In particular embodiments, suppressing entities based on duplication-values may remove from consideration entities which may be substantial duplicates of a canonical-entity. Additionally, entities which may be inferior, less relevant, or of less interest to users may be suppressed. Although this disclosure describes particular entities suppressed based on particular duplication-values, this disclosure contemplates any suitable entities suppressed based on any suitable duplication-values.

In particular embodiments, after identifying multiple entities in response to receiving a query from a user, the social-networking system 160 may suppress an identified entity based at least in part on social-graph information associated with the entity. As an example and not by way of limitation, social-graph information associated with an entity may include a number of check-ins, likes, or reviews associated with the entity, and if an entity has less than a threshold number of check-ins, likes, or reviews, then the entity may be suppressed. As another example and not by way of limitation, entities having the lowest numbers of check-ins, likes, or reviews (e.g., the bottom 50% of a group of identified entities) may be suppressed. As another example and not by way of limitation, social-graph information associated with an entity may include an affinity coefficient between the entity and a canonical-entity, and an entity associated with an affinity coefficient that is below a threshold affinity-coefficient value may be suppressed. As another example and not by way of limitation, social-graph information associated with an entity may include an affinity coefficient between the entity and a user of the social-networking system 160. The user may have sent a query to social-networking system 160, and social-networking system 160 may suppress an entity that has an affinity coefficient between the entity and the user that is less than a threshold-affinity coefficient value. In particular embodiments, suppressing entities based on social-graph information may remove from consideration entities which may be less popular, relevant, or interesting to a user. Although this disclosure describes particular entities suppressed based on particular social-graph information, this disclosure contemplates any suitable entities suppressed based on any suitable social-graph information.

In particular embodiments, entities may be suppressed based on a combination of information, such as for example, a combination of duplication-values and social-graph information. As an example and not by way of limitation, the social-networking system 160 may suppress an entity if it has (1) a duplication-value with respect to a canonical-entity above a threshold duplication-value and (2) an associated affinity coefficient below a threshold affinity-coefficient value. As another example and not by way of limitation, an entity may be suppressed if it is a substantial duplicate of a canonical-entity (e.g., based on an associated duplication-value) and if it is a low-quality or low-relevance entity (e.g., based on social-graph information). In particular embodiments, whether or not an entity is suppressed may depend on a particular criteria for suppressing entities. As an example and not by way of limitation, a particular entity may be suppressed if the criteria is based primarily on duplication-values associated with the entity, whereas the same entity may not be suppressed if the criteria is based primarily on social-graph information. Although this disclosure describes particular entities suppressed based on particular social-graph information or particular duplication-values, this disclosure contemplates any suitable entities suppressed based on any suitable social-graph information or any suitable duplication-values.

In particular embodiments, the social-networking system 160 may update a list of entities associated with a canonical-entity to remove one or more suppressed entities from the list. As an example and not by way of limitation, a list of entities associated with a canonical-entity may include entities that are similar to the canonical-entity, relevant to the canonical-entity, or have a relatively high duplication-value with respect to the canonical-entity. A list of entities associated with the canonical-entity "New York City" may include "Joe's Big Apple Page," and if "Joe's Big Apple Page" is suppressed, then it may also be removed from the list of entities associated with the "New York City" entity. As another example and not by way of limitation, if the entity "Paris Las Vegas" is suppressed relative to the entity "Paris, France," then the entity "Paris Las Vegas" may also be removed from a list of entities associated with the "Paris, France" entity.

In particular embodiments, the social-networking system 160 may send, to a client system 130 of a user, a search-results page for display to the user. As an example and not by way of limitation, a search-results page may include references to one or more non-suppressed entities of a group of entities identified in response to a query from the user. The search-results page may be presented to the user on a webpage of social-networking system 160 (e.g., via a web browser 132) or on a user interface (UI) of a native application associated with social-networking system 160 (e.g., a mobile social-networking application). A reference to an entity may include an icon, picture, or text associated with the entity, and the user may interact with or select the reference (e.g., by tapping on the reference). In particular embodiments, a search-results page may include a reference to a canonical-entity. As an example and not by way of limitation, if a user searches for "new york," the search-results page may include a reference to the canonical-entity "New York City." In particular embodiments, a search-results page may include a reference to a canonical-entity and a reference to a non-suppressed entity. As an example and not by way of limitation, if a user searches for "venice beach," the search-results page may include a reference to the canonical-entity "Venice Beach" along with a reference to the non-suppressed entity "Inn at Venice Beach." Although this disclosure describes particular search-results pages that include particular entities, this disclosure contemplates any suitable search-results pages that include any suitable entities.

In particular embodiments, the social-networking system 160 may receive, from a client system 130 of a user, a response indicating that the user interacted with a canonical-entity. As an example and not by way of limitation, in response to the search "new york" submitted by a user, the social-networking system 160 may send a search-results page that includes references to the canonical-entity "New York City" and a non-suppressed entity "The Big Apple." In particular embodiments, the social-networking system 160 may receive a response indicating that the user interacted with a canonical-entity, and the social-networking system 160 may increase a duplication-value of a non-suppressed entity. As an example and not by way of limitation, when presented with a search-results page that includes references to the canonical-entity "New York City" and the non-suppressed entity "The Big Apple," if the user interacts with the "New York City" entity, the social-networking system 160 may increase a duplication-value of "The Big Apple" entity with respect to the "New York City" entity. User interactions may include checking-in to, liking, or selecting an entity (e.g., to view additional information about the entity), or any other suitable user interaction. In particular embodiments, based on how users interact with entities in a search-results page, the social-networking system 160 may adjust one or more duplication-values associated with the entities. As an example and not by way of limitation, when users are presented with a search-results page that includes references to canonical-entity X and non-suppressed entity Y, if 80% of the users select or interact with canonical-entity X, then the social-networking system 160 may increase a duplication-value of entity Y with respect to entity X. Having most of the users interact with a canonical-entity instead of a non-suppressed entity indicates that the two entities may be duplicates, and their duplication-value may be increased accordingly.

In particular embodiments, the social-networking system 160 may receive, from a client system 130 of a user, a response indicating that the user interacted with a non-suppressed entity. As an example and not by way of limitation, in response to the search "big apple" submitted by a user, the social-networking system 160 may send a search-results page that includes references to the canonical-entity "New York City" and a non-suppressed entity "Big Apple Cleaners." In particular embodiments, the social-networking system 160 may receive a response indicating that the user interacted with a non-suppressed entity, and the social-networking system 160 may decrease a duplication-value of the non-suppressed entity. As an example and not by way of limitation, when presented with a search-results page that includes references to the canonical-entity "New York City" and the non-suppressed entity "Big Apple Cleaners," if the user disregards the "New York City" entity and interacts with the "Big Apple Cleaners" entity, the social-networking system 160 may decrease a duplication-value of "Big Apple Cleaners" with respect to the "New York City" entity. As another example and not by way of limitation, when users are presented with a search-results page that includes references to canonical-entity X and non-suppressed entity Y, if 70% of the users interact with entity Y, then the social-networking system 160 may decrease a duplication-value of entities X and Y. Having most of the users interact with a non-suppressed entity indicates that the two entities may not be duplicates, and their duplication-value may be decreased accordingly.

In particular embodiments, the social-networking system 160 may receive a response indicating that the user interacted with a particular reference corresponding to a non-suppressed entity, and, based on the user interaction, the social-networking system 160 may adjust a duplication-value of one or more non-suppressed entities. As an example and not by way of limitation, when presented with a search-results page that includes references to canonical-entity A and non-suppressed entities B and C, if the user interacts with entity B, then the social-networking system 160 may decrease a duplication-value of entity B with respect to entity A and increase a duplication-value of entity C with respect to entity A. As another example and not by way of limitation, when users are presented with a search-results page that includes references to canonical-entity X and non-suppressed entity Y, if approximately one-half of the users interact with entity X and the other half of the users interact with entity Y, then the social-networking system 160 may decrease a duplication-value of entities X and Y. If users interact approximately equally with both entities, then this indicates that the two entities may be distinct entities (e.g., they may not be duplicates), and their duplication-value may be adjusted accordingly. Although this disclosure describes particular adjustments of particular duplication-values based on particular user interactions with particular entities, this disclosure contemplates any suitable adjustments of any suitable duplication-values based on any suitable user interactions with any suitable entities.

In particular embodiments, the social-networking system 160 may receive, from a client system 130 of a user, a follow-up query inputted by the user, the follow-up query indicating a suppressed entity. As an example and not by way of limitation, when a user submits the search query "big apple," they may be presented with a search-results page that includes a reference to the canonical-entity "New York City." The entity "Big Apple Cleaners" may be a suppressed entity and it may not be included in the search-results page. If the user disregards the "New York City" entity and sends a follow-up search query, such as for example, "big apple cleaners," then the social-networking system 160 may present a search-results page that includes a reference to the entity "Big Apple Cleaners." In particular embodiments, based on a follow-up query that indicates a suppressed entity, a duplication-value of the suppressed entity may be adjusted. As an example and not by way of limitation, after receiving the follow-up search query "big apple cleaners," the social-networking system 160 may decrease, based on the follow-up query, the duplication-value of "Big Apple Cleaners" with respect to the entity "New York City." A user providing a follow-up query for a suppressed entity indicates that the suppressed entity may correspond to a separate or distinct entity with respect to a canonical-entity, and the corresponding duplication-value may be decreased accordingly. Although this disclosure describes particular duplication-value adjustments based on particular follow-up queries, this disclosure contemplates any suitable duplication-value adjustments based on any suitable follow-up queries.

Figure 9:
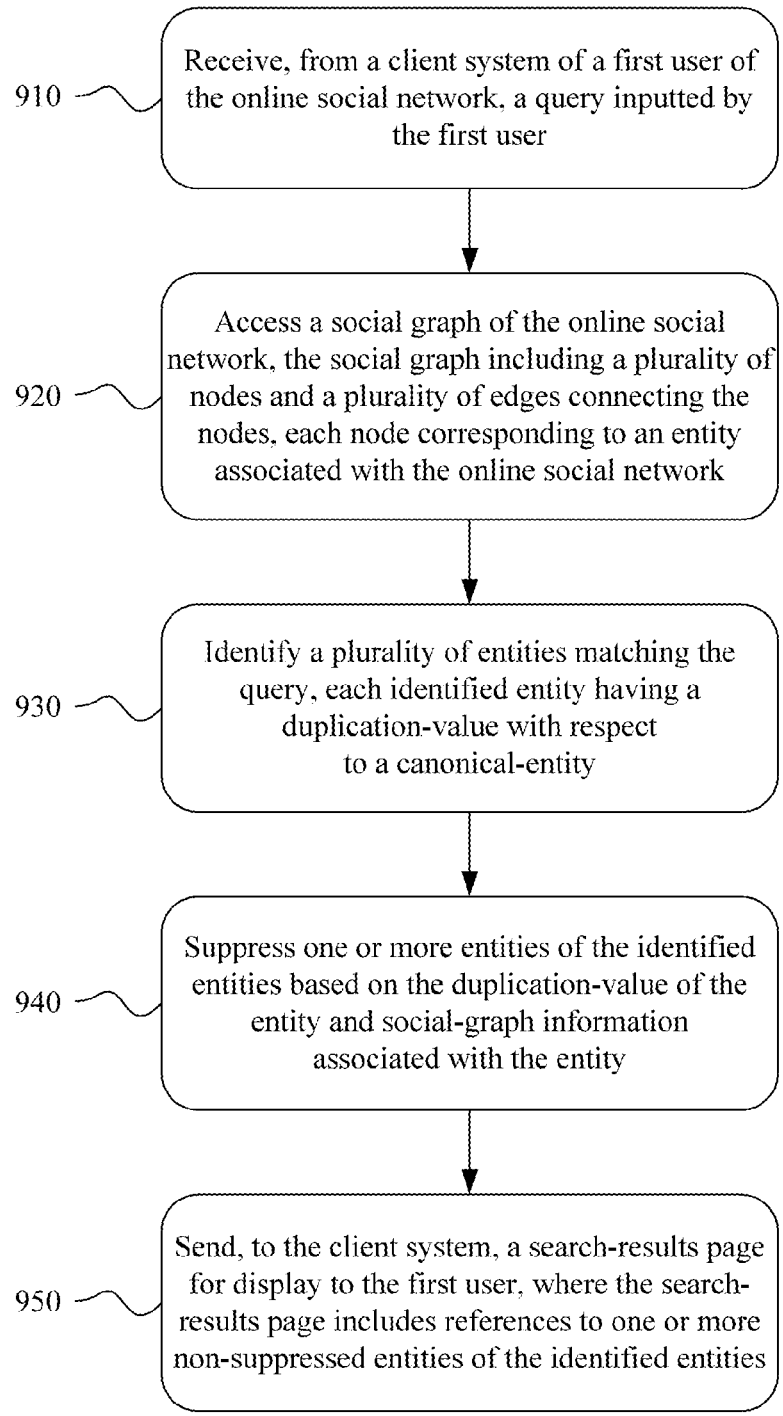
FIG. 9 illustrates an example method for suppressing entity suggestions.

FIG. 9 illustrates an example method 900 for suppressing entity suggestions. The method may begin at step 910, where the social-networking system 160 may receive, from a client system 130 of a first user of the online social network, a query inputted by the first user. At step 920, the social-networking system 160 may access a social graph of the online social network, the social graph including a plurality of nodes and a plurality of edges connecting the nodes, each node corresponding to an entity associated with the online social network. At step 930, the social-networking system 160 may identify a plurality of entities matching the query, each identified entity having a duplication-value with respect to a canonical-entity. In particular embodiments, a duplication-value between an identified entity and a canonical-entity may be based at least in part on a name similarity between the identified entity and the canonical-entity. At step 940, the social-networking system 160 may suppress one or more entities of the identified entities based on the duplication-value of the entity and social-graph information associated with the entity. At step 950, the social-networking system 160 may send, to the client system 130, a search-results page for display to the first user, where the search-results page includes references to one or more non-suppressed entities of the identified entities, at which point the method may end. Particular embodiments may repeat one or more steps of the method of FIG. 9, where appropriate.

Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for suppressing entity suggestions including the particular steps of the method of FIG. 9, this disclosure contemplates any suitable method for suppressing entity suggestions including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Advertising

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 10:
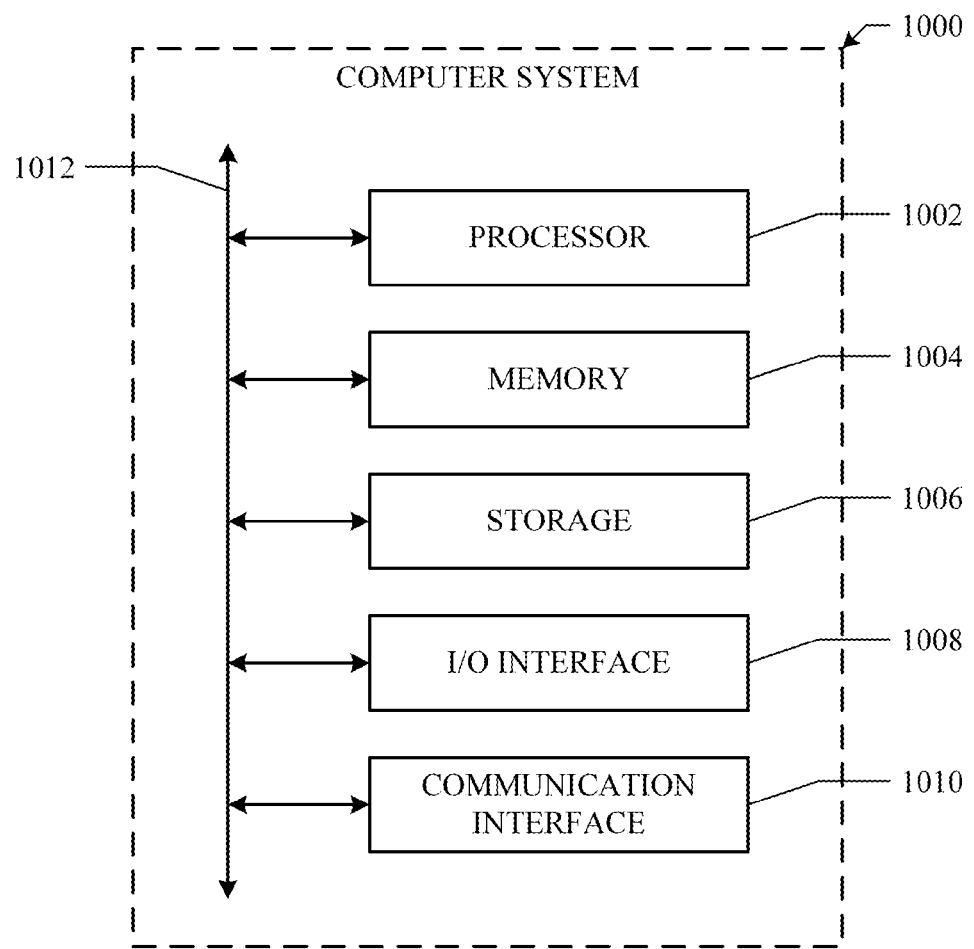
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical drive, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices of an online social network:
    sending, to a client system of a first user of the online social network, a first request to compare two or more place-entities associated with the online social network, wherein the first user is connected to each place-entity within a social graph of the online social network, each place-entity being associated with a particular score on a first scoring scale and a first feature;
    receiving, from the client system, comparison information responsive to the first request, the comparison information indicating an ordered ranking of the two or more place-entities;
    accessing a scored list of place-entities associated with the online social network, wherein the scored list is based on scores on the first scoring scale for the place-entities, and wherein the place-entitles of the scored list comprise at least the two or more place-entities of the first request;
    ranking the scored list of place-entities based at least in part on the scores on the first scoring scale and the comparison information, the ranked list of place-entities comprising at least the two or more place-entities of the first request; and
    determining a place-classifier algorithm based at least in part on the ranked list of place-entities and one or more features associated with each place-entity of the ranked list, wherein the one or more features comprises at least the first feature.

2. The method of claim 1, wherein the social graph comprises a plurality of nodes and a plurality of edges connecting the nodes, each of the edges between two of the nodes representing a single degree of separation between them, wherein the first user corresponds to a first node in the social graph and a plurality of place-entities correspond to a plurality of second nodes in the social graph, respectively.

3. The method of claim 1, wherein the first user being connected to each place-entity within the social graph corresponds to the first user having previously performed, via the online social network, a social-networking interaction with each of the two or more place-entities.

4. The method of claim 3, wherein the social-networking interaction comprises a check-in, a like, or a review submitted by the first user.

5. The method of claim 1, wherein:
    the first request comprises a request to compare two place-entities; and
    the received comparison information comprises an indication of which place-entity, of the two place-entities, the first user prefers.

6. The method of claim 1, wherein the each place-entity being associated with the particular score on the first scoring scale corresponds to each place-entity having a score on the first scoring scale within a threshold of the particular score.

7. The method of claim 1, wherein each place-entity having the score on the first scoring scale within the threshold of the particular score corresponds to the score being within 10% of the particular score.

8. The method of claim 1, wherein the each place-entity being associated with the particular score on the first scoring scale corresponds to each place-entity having a score on the first scoring scale equal to the particular score.

9. The method of claim 1, further comprising receiving a plurality of other comparison information from a respective plurality of other users of the online social network.

10. The method of claim 1, wherein the ranked list of place-entities further comprises a plurality of other place-entities about which other comparison information was received from other users of the online social network.

11. The method of claim 1, wherein ranking the scored list of place-entities comprises performing a topological sorting operation based on the comparison information and a plurality of other comparison information received from other users of the online social network.

12. The method of claim 1, further comprising:
receiving a request for a list of top N place-entities having a particular feature, wherein N is a positive integer; and
filtering the ranked list based on the particular feature to determine the top N place-entities having the particular feature.

13. The method of claim 1, further comprising:
receiving a request for a list of top N place-entities near a particular location, wherein N is a positive integer; and
filtering the ranked list to determine the top N place-entities having a location within a threshold distance from the particular location.

14. The method of claim 1, further comprising applying the place-classifier algorithm to predict a result of a pairwise comparison of two place-entities presented to the first user.

15. The method of claim 1, further comprising applying the place-classifier algorithm to generate a list of top-ranked place-entities.

16. The method of claim 1, wherein the place-classifier algorithm is a global classifier configured to generate a non-personalized list of place-entities based at least in part on global features of the place-entities.

17. The method of claim 1, wherein the place-classifier algorithm is a personalized classifier configured to generate a list of place-entities customized for the first user of the online social network based at least in part on user-specific features.

18. The method of claim 1, wherein the client system is a mobile computing system, and wherein the first request is presented to the user on a webpage of the online social network or on an interface of a native application associated with the online social network.

19. One or more computer-readable non-transitory storage media embodying software that is operable when executed to:
send, to a client system of a first user of an online social network, a first request to compare two or more place-entities associated with the online social network, wherein the first user is connected to each place-entity within a social graph of the online social network, each place-entity being associated with a particular score on a first scoring scale and a first feature;
receive, from the client system, comparison information responsive to the first request, the comparison information indicating an ordered ranking of the two or more place-entities;
access a scored list of place-entities associated with the online social network, wherein the scored list is based on scores on the first scoring scale for the place-entities, and wherein the place-entitles of the scored list comprise at least the two or more place-entities of the first request;
rank the scored list of place-entities based at least in part on the scores on the first scoring scale and the comparison information, the ranked list of place-entities comprising at least the two or more place-entities of the first request; and
determine a place-classifier algorithm based at least in part on the ranked list of place-entities and one or more features associated with each place-entity of the ranked list, wherein the one or more features comprises at least the first feature.

20. A system comprising: one or more processors; and a memory coupled to the processors comprising instructions executable by the processors, the processors operable when executing the instructions to:
send, to a client system of a first user of an online social network, a first request to compare two or more place-entities associated with the online social network, wherein the first user is connected to each place-entity within a social graph of the online social network, each place-entity being associated with a particular score on a first scoring scale and a first feature;
receive, from the client system, comparison information responsive to the first request, the comparison information indicating an ordered ranking of the two or more place-entities;
access a scored list of place-entities associated with the online social network, wherein the scored list is based on scores on the first scoring scale for the place-entities, and wherein the place-entitles of the scored list comprise at least the two or more place-entities of the first request;
rank the scored list of place-entities based at least in part on the scores on the first scoring scale and the comparison information, the ranked list of place-entities comprising at least the two or more place-entities of the first request; and
determine a place-classifier algorithm based at least in part on the ranked list of place-entities and one or more features associated with each place-entity of the ranked list, wherein the one or more features comprises at least the first feature.

21. The system of claim 20, wherein the social graph comprises a plurality of nodes and a plurality of edges connecting the nodes, each of the edges between two of the nodes representing a single degree of separation between them, wherein the first user corresponds to a first node in the social graph and a plurality of place-entities correspond to a plurality of second nodes in the social graph, respectively.

22. The system of claim 20, wherein the first user being connected to each place-entity within the social graph corresponds to the first user having previously performed, via the online social network, a social-networking interaction with each of the two or more place-entities.

23. The system of claim 22, wherein the social-networking interaction comprises a check-in, a like, or a review submitted by the first user.

24. The system of claim 20, wherein:
the first request comprises a request to compare two place-entities; and
the received comparison information comprises an indication of which place-entity, of the two place-entities, the first user prefers.

25. The system of claim 20, wherein the each place-entity being associated with the particular score on the first scoring scale corresponds to each place-entity having a score on the first scoring scale within a threshold of the particular score.

26. The system of claim 20, wherein each place-entity having the score on the first scoring scale within the threshold of the particular score corresponds to the score being within 10% of the particular score.

27. The system of claim 20, wherein the each place-entity being associated with the particular score on the first scoring scale corresponds to each place-entity having a score on the first scoring scale equal to the particular score.

28. The system of claim 20, further comprising receiving a plurality of other comparison information from a respective plurality of other users of the online social network.

29. The system of claim 20, wherein the ranked list of place-entities further comprises a plurality of other place-entities about which other comparison information was received from other users of the online social network.

30. The system of claim 20, wherein ranking the scored list of place-entities comprises performing a topological sorting operation based on the comparison information and a plurality of other comparison information received from other users of the online social network.

31. The system of claim 20, further comprising:
receiving a request for a list of top N place-entities having a particular feature, wherein N is a positive integer; and
filtering the ranked list based on the particular feature to determine the top N place-entities having the particular feature.

32. The system of claim 20, further comprising:
receiving a request for a list of top N place-entities near a particular location, wherein N is a positive integer; and
filtering the ranked list to determine the top N place-entities having a location within a threshold distance from the particular location.

33. The system of claim 20, further comprising applying the place-classifier algorithm to predict a result of a pairwise comparison of two place-entities presented to the first user.

34. The system of claim 20, further comprising applying the place-classifier algorithm to generate a list of top-ranked place-entities.

35. The system of claim 20, wherein the place-classifier algorithm is a global classifier configured to generate a non-personalized list of place-entities based at least in part on global features of the place-entities.

36. The system of claim 20, wherein the place-classifier algorithm is a personalized classifier configured to generate a list of place-entities customized for the first user of the online social network based at least in part on user-specific features.

37. The system of claim 20, wherein the client system is a mobile computing system, and wherein the first request is presented to the user on a webpage of the online social network or on an interface of a native application associated with the online social network.

* * * * *